(12) United States Patent
Cao et al.

(10) Patent No.: US 10,382,169 B2
(45) Date of Patent: Aug. 13, 2019

(54) HARQ SYSTEMS AND METHODS FOR GRANT-FREE UPLINK TRANSMISSIONS

(71) Applicants: Yu Cao, Kanata (CA); Liqing Zhang, Ottawa (CA)

(72) Inventors: Yu Cao, Kanata (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/470,455

(22) Filed: Mar. 27, 2017

(65) Prior Publication Data

US 2017/0288817 A1 Oct. 5, 2017

Related U.S. Application Data

(63) Continuation-in-part of application No. 15/088,607, filed on Apr. 1, 2016.

(60) Provisional application No. 62/459,949, filed on Feb. 16, 2017, provisional application No. 62/421,087, filed on Nov. 11, 2016, provisional application No. 62/416,939, filed on Nov. 3, 2016.

(51) Int. Cl.
*H04L 1/08* (2006.01)
*H04L 1/18* (2006.01)
*H04L 1/00* (2006.01)

(52) U.S. Cl.
CPC .......... *H04L 1/1812* (2013.01); *H04L 1/0079* (2013.01); *H04L 1/1819* (2013.01); *H04L 1/1845* (2013.01); *H04L 1/1887* (2013.01)

(58) Field of Classification Search
CPC ... H04L 1/1812; H04L 1/0079; H04L 1/1819; H04L 1/1845; H04L 1/1887
See application file for complete search history.

(56) References Cited

U.S. PATENT DOCUMENTS

| | | | |
|---|---|---|---|
| 2012/0113945 | A1 | 5/2012 | Moon et al. |
| 2014/0075199 | A1 | 3/2014 | Hiwatari et al. |
| 2014/0140336 | A1 | 5/2014 | Callard et al. |
| 2014/0161068 | A1 | 6/2014 | Vrzic et al. |

(Continued)

FOREIGN PATENT DOCUMENTS

| | | |
|---|---|---|
| CN | 101374038 A | 2/2009 |
| CN | 101855934 A | 10/2010 |

(Continued)

OTHER PUBLICATIONS

3GPP TSG RAN WG1 Meeting #86 R1-167206,"HARQ timing relationships for grant-free transmission", Huawei, HiSilicon, Aug. 22-26, 2016, total 2 pages.

(Continued)

*Primary Examiner* — Kyle Vallecillo

(57) ABSTRACT

Systems and methods are disclosed for performing hybrid automatic repeat request (HARQ) for grant-free uplink transmissions. Some of the systems and methods disclosed herein may address problems such as how to perform acknowledgement (ACK) and/or negative acknowledgement (NACK), how to determine and signal retransmission timing, how to determine the transmission/retransmission attempt and the redundancy version (RV), and/or how to perform the HARQ combining.

48 Claims, 22 Drawing Sheets

(56) References Cited

U.S. PATENT DOCUMENTS

| | | |
|---|---|---|
| 2014/0192767 A1* | 7/2014 | Au .................... H04W 72/0413 370/330 |
| 2014/0254544 A1* | 9/2014 | Kar Kin Au .......... H04L 5/0033 370/330 |
| 2015/0236823 A1 | 8/2015 | Djukic et al. |
| 2016/0044656 A1 | 2/2016 | Novak et al. |
| 2016/0119184 A1 | 4/2016 | Soriaga et al. |
| 2016/0219627 A1* | 7/2016 | Au .................... H04W 74/0841 |
| 2016/0295607 A1 | 10/2016 | Vajapeyam et al. |
| 2016/0353453 A1* | 12/2016 | Au ...................... H04W 74/006 |
| 2017/0019232 A1 | 1/2017 | Seo et al. |
| 2017/0034845 A1* | 2/2017 | Liu ....................... H04L 1/0003 |
| 2017/0164349 A1* | 6/2017 | Zhu ....................... H04W 48/18 |
| 2017/0187494 A1 | 6/2017 | Tirronen et al. |
| 2017/0257195 A1* | 9/2017 | Maaref ................. H04L 1/0057 |
| 2017/0289920 A1* | 10/2017 | Liu ....................... H04W 52/10 |
| 2018/0146445 A1 | 5/2018 | Lee et al. |

FOREIGN PATENT DOCUMENTS

| | | |
|---|---|---|
| CN | 105284172 A | 1/2016 |
| EP | 2114029 A1 | 11/2009 |
| EP | 2929744 A1 | 10/2015 |
| WO | 2010130187 A1 | 11/2010 |

OTHER PUBLICATIONS

Huawei et al., "The retransmission and HARQ schemes for grant-free" 3GPP TSG RAN WG1 Meeting #86bis, R1-1608859, Oct. 14, 2016, 5 pages, Lisbon, Portugal.

Huawei et al:"Uplink latency reduction for synchronized UEs", 3GPP DRAFT;R2-153374, Aug. 23, 2015, XP05100410, 5 pages.

KT CORP:"PHICH for MTC UEs", 3GPP DRAFT;R1-153293, May 16, 2015, XP05097369, 2 pages.

CMCC:"Discussion on issues related to PUSCH transmission for LAA", 3GPP DRAFT;R1-160495, Feb. 5, 2016, XP051063817, 4 pages.

Nokia Siemens Networks et al:"Remaining issues on uplink power control", 3GPP DRAFT;R1-111021, Feb. 15, 2011, XP050490714, 1 page.

* cited by examiner

| UE | Index for 3-tuple | {P1} Initial Tx | {P2} 1st Re-Tx | {P3} 2nd Re-Tx |
|---|---|---|---|---|
| 102a | 1 | p11 | p21 | p31 |
| 102b | 2 | p12 | p22 | p32 |
| 102c | 3 | p13 | p23 | p33 |

304 →

| UE | Index for 3-tuple | Initial Tx | 1st Re-Tx | 2nd Re-Tx |
|---|---|---|---|---|
| 102a | 1 | codebook A1 | codebook B1 | codebook C1 |
| 102b | 2 | codebook A2 | codebook B2 | codebook C2 |
| 102c | 3 | codebook A3 | codebook B3 | codebook C3 |

306 →

| UE | Index for 3-tuple | Initial Tx | 1st Re-Tx | 2nd Re-Tx |
|---|---|---|---|---|
| 102a | 1 | resource A1 | resource B1 | resource C1 |
| 102b | 2 | resource A2 | resource B2 | resource C2 |
| 102c | 3 | resource A3 | resource B3 | resource C3 |

| Index for 2-tuple | {P1} Initial Tx | {P2} Re-Txs |
|---|---|---|
| 1 | p11 | p21 |
| 2 | p12 | p22 |
| 3 | p13 | p23 |
| 4 | p14 | p24 |

| UE | Index for 3-tuple | {P1} RV0 | {P2} RV1 | {P3} RV2 |
|---|---|---|---|---|
| 102a | 1 | p11 | p21 | p31 |
| 102b | 2 | p12 | p22 | p32 |
| 102c | 3 | p13 | p23 | p33 |

354 →

| Index for 3-tuple | RV0 | RV1 | RV2 |
|---|---|---|---|
| 1 | codebook A1 | codebook B1 | codebook C1 |
| 2 | codebook A2 | codebook B2 | codebook C2 |
| 3 | codebook A3 | codebook B3 | codebook C3 |

356 →

| Index for 3-tuple | RV0 | RV1 | RV2 |
|---|---|---|---|
| 1 | resource A1 | resource B1 | resource C1 |
| 2 | resource A2 | resource B2 | resource C2 |
| 3 | resource A3 | resource B3 | resource C3 |

| Index for 2-tuple | {P1} Initial Tx RV0 | {P2} 1st Re-Tx RV1 | {P2} 2nd Re-Tx RV2 | {P2} 3rd Re-Tx RV3 |
|---|---|---|---|---|
| 1 | p11 | p21 | p21 | p21 |
| 2 | p12 | p22 | p22 | p22 |
| 3 | p13 | p23 | p23 | p23 |
| 4 | p14 | p24 | p24 | p24 |

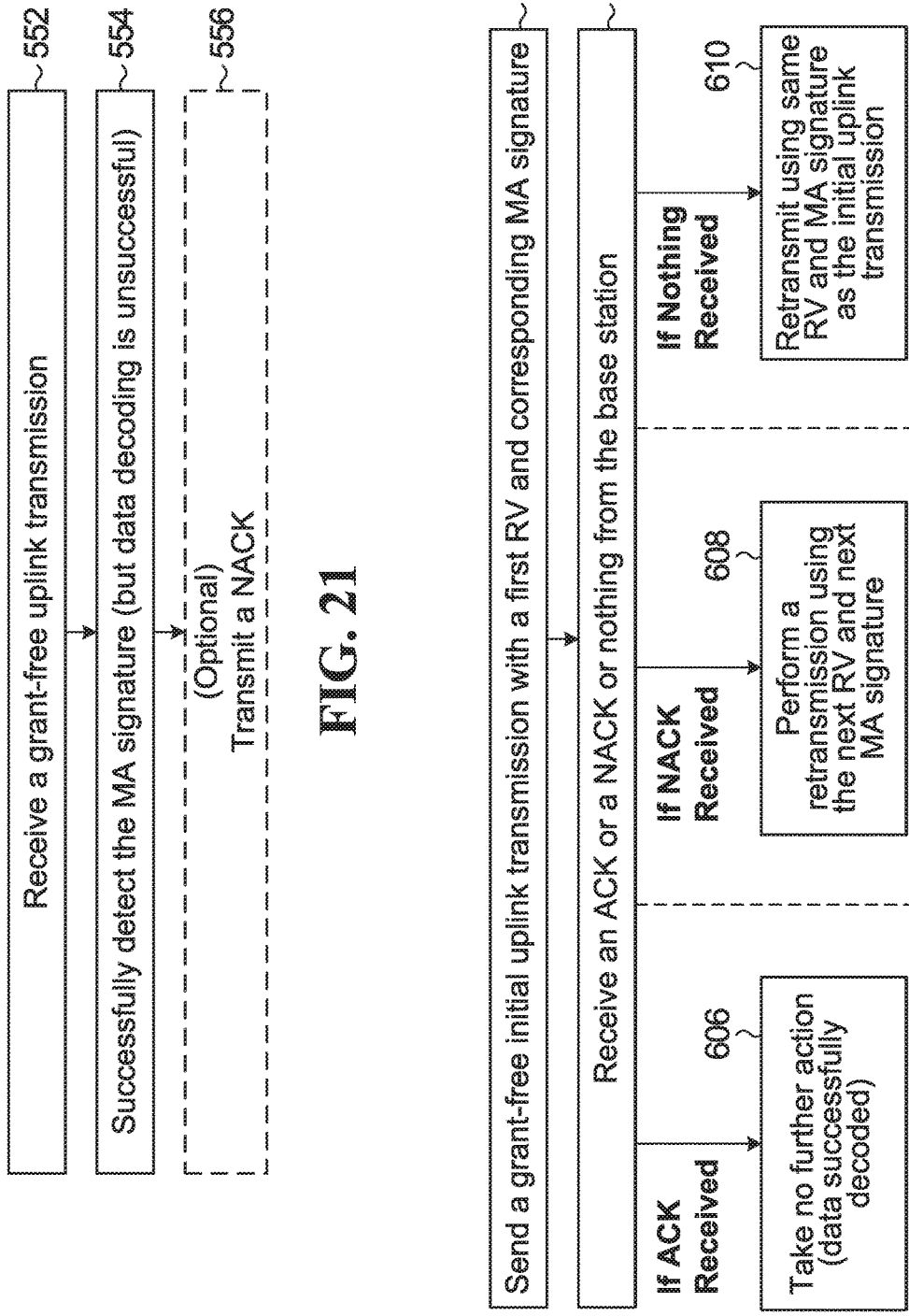

US 10,382,169 B2

HARQ SYSTEMS AND METHODS FOR GRANT-FREE UPLINK TRANSMISSIONS

PRIORITY CLAIM

This application is a Continuation-in-Part of U.S. Regular patent application Ser. No. 15/088,607 titled "System and Method for Pilot Assisted Grant-Free Uplink Transmission Identification" filed Apr. 1, 2016, and also claims priority to U.S. Provisional Patent Application Ser. No. 62/416,939 titled "HARQ Systems and Methods for Grant-Free Uplink Transmissions" filed Nov. 3, 2016, and to U.S. Provisional Patent Application Ser. No. 62/421,087 titled "HARQ Systems and Methods for Grant-Free Uplink Transmissions" filed Nov. 11, 2016, and to U.S. Provisional Patent Application Ser. No. 62/459,949 titled "HARQ Signaling for Grant-Free Uplink Transmissions" filed Feb. 16, 2017, all four of which are incorporated herein by reference.

FIELD

The present application relates to grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may also or instead support grant-free uplink transmissions. That is, a UE may send uplink transmissions using certain uplink resources possibly shared with other UEs, without specifically requesting use of the resources and without specifically being granted the resources by the base station. A grant-free uplink transmission does not need a dynamic and explicit scheduling grant from the base station.

In some cases, when a UE sends a grant-free uplink transmission, the base station may not be able to decode the data in the uplink transmission.

SUMMARY

Hybrid automatic repeat request (HARQ) is a method in which data to be transmitted is encoded using an error correction code. Then, if the encoded data is corrupted during transmission and the receiver is unable to correct the errors, a retransmission is performed.

HARQ methods for grant-based uplink transmissions may not be applicable to grant-free uplink transmissions, because of the nature of grant-free uplink transmissions. For example, in a grant-free uplink transmission scheme, there may be no scheduling grant from the base station that specifies information such as which UEs are to transmit initial and retransmissions using which resources.

Systems and methods are disclosed for performing HARQ for grant-free uplink transmissions. Some of the systems and methods disclosed herein may address problems such as how to perform acknowledgement (ACK) and/or negative acknowledgement (NACK), how to determine and signal retransmission timing, how to determine the transmission/retransmission attempt and the redundancy version (RV), and/or how to perform the HARQ combining.

BRIEF DESCRIPTION OF THE DRAWINGS

Embodiments will be described, by way of example only, with reference to the accompanying figures wherein:

FIGS. 4 to 7 illustrate tables showing example mappings between transmissions and MA signatures, redundancy versions, and/or physical resources;

FIG. 8 is a method performed by a base station, according to one embodiment;

FIG. 21 is a flowchart of a method performed by a base station, according to another embodiment;

FIG. 22 is a flowchart of a method performed by a UE, according to one embodiment;

DETAILED DESCRIPTION

For illustrative purposes, specific example embodiments will now be explained in greater detail below in conjunction with the figures.

Figure 1:
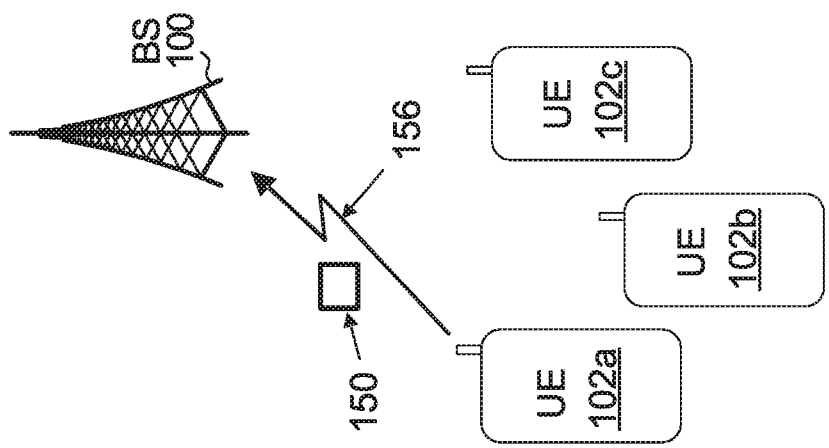
FIG. 1 is a block diagram of a base station and a plurality of UEs, according to one embodiment.

FIG. 1 is a block diagram of a base station 100 and a plurality of UEs 102a-c, according to one embodiment.

The word "base station" encompasses any device that wirelessly receives data in the uplink from UEs. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, the word "base station", as used herein, may refer to modules of the network.

In operation, UEs 102*a-c* may each send grant-free uplink transmissions to the base station 100. A grant-free uplink transmission is an uplink transmission that is sent using uplink resources not specifically granted to the UE by the base station 100. A grant-free uplink transmission does not need a dynamic and explicit scheduling grant from the base station 100. A UE sending a grant-free uplink transmission, or configured to send a grant-free uplink transmission, may be referred to as operating in "grant-free mode".

Grant-free uplink transmissions are sometimes called "grant-less", "schedule free", or "schedule-less" transmissions, or transmissions without grant. Grant-free uplink transmissions from different UEs 102*a-c* may be transmitted using the same designated resources, in which case the grant-free uplink transmissions are contention-based transmissions. Grant-free uplink transmissions may be suitable for transmitting bursty traffic with short packets from the UEs 102*a-c* to the base station 100, and/or for transmitting data to the base station 100 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to these applications.

The uplink resources on which grant-free transmissions are sent will be referred to as "grant-free uplink resources". For example, the grant-free uplink resources may be a designated region in an OFDMA frame. The UEs 102*a-c* may use the designated region to send their grant-free uplink transmissions, but the base station 100 does not know which of the UEs 102*a-c*, if any, are going to send a grant-free uplink transmission in the designated region.

The grant-free uplink resources may be predefined, e.g. known in advance to both the UEs and the base station 100. The grant-free uplink resources may be static (never change), or the grant-free uplink resources may be configured semi-statically. A semi-static configuration means it is configured once and can only be updated/changed slowly, such as once in many frames, or may only be updated as needed. A semi-static change differs from a dynamic change in that a semi-static change does not occur as often as a dynamic change. For example, a dynamic change/update may refer to a change every subframe or every few subframes, and a semi-static change may refer to a change that only occurs once every several OFDM frames, once every few seconds, or update only if needed.

In some embodiments, the grant-free uplink resources may be preconfigured, e.g. there may be a plurality of possible predefined grant-free uplink resource partitions, and the base station 100 or the network may semi-statically pick one of the predefined grant-free uplink resource partitions and signal to the UEs the grant-free uplink resource partition being used. In some embodiments, the base station 100 and/or the UEs may be configured during their manufacture to know which uplink resources to use as grant-free uplink resources, e.g. through predefined tables loaded during manufacture. In some embodiments, the grant-free uplink resources may be semi-statically configured by the base station 100, e.g. by using a combination of broadcast signalling, higher layer signalling (e.g. RRC signalling) and dynamic signalling (e.g. downlink control information). By dynamically signaling the grant-free uplink resources, the base station may adapt to the system traffic load of the UEs. For example, more grant-free uplink resources may be allocated when there are more UEs being served that may send grant-free uplink transmissions. In some embodiments, a control node (e.g. a computer) in the network may determine the grant-free uplink resources to be used. The network may then indicate the grant-free uplink resources to the base station and the UEs. In some embodiments, a UE operating in grant-free mode may be semi-statically configured to combine the following information to determine an assigned grant-free transmission resource: 1) the RRC signaling information and the system information; or 2) the RRC signaling information and the downlink control information (DCI); or 3) the RRC signaling information, the system information and the DCI information.

FIG. 1 illustrates a message 150 being sent by UE 102*a* in a grant-free uplink transmission over uplink channel 156. The message 150 is transmitted using a multiple access (MA) resource. A MA resource is comprised of a MA physical resource (e.g. a time-frequency block) and at least one MA signature. The MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension. The term "pilot" refers to a signal that at least includes a reference signal, e.g. a demodulation reference signal. The reference signal may be the MA signature. In some embodiments, the pilot may include the demodulation reference signal, possibly along with a channel-estimation-oriented preamble, or a random access channel (LTE-like RACH) preamble.

In some embodiments, the uplink transmission may use cyclic-prefix (CP) orthogonal frequency division multiplex (OFDM), similar to the waveform used for LTE downlink transmission. In some embodiments, the uplink transmission may use single carrier frequency division multiple access (SC-FDMA), similar to the waveform used for LTE uplink transmission. In some embodiments, the uplink transmissions may use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Depending upon the multiple access method used, the MA signature may take different forms. The MA signature may relate to the specific format used for the multiple access method. For example, if SCMA is used, then the MA signature for the uplink transmission may be the SCMA codebook used for the uplink transmission. As another example, if IGMA is used, then the MA signature for the uplink transmission may be the IGMA's signature, interleaving pattern or grid mapping used for the uplink transmission.

Figure 2:
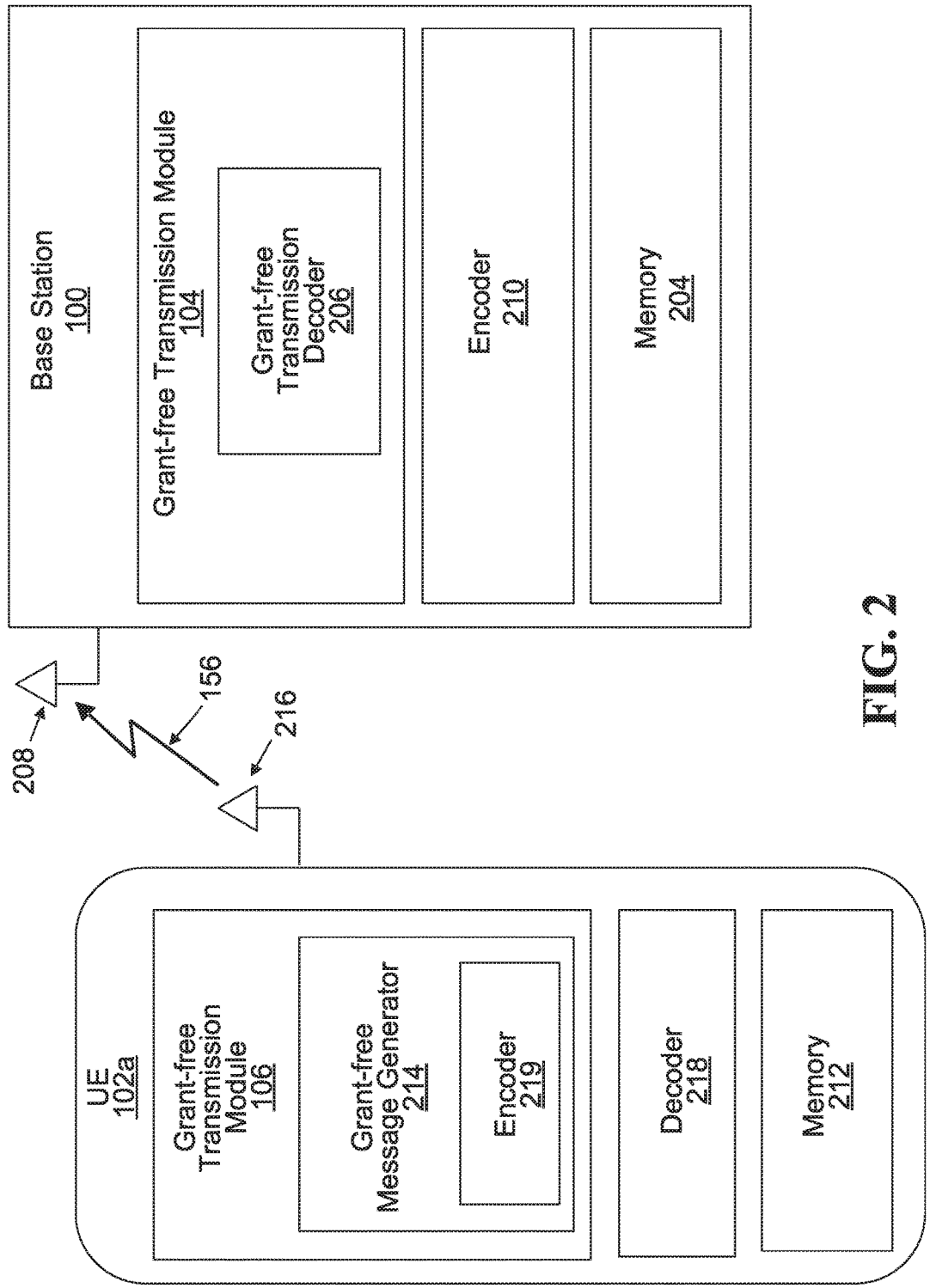
FIG. 2 is a block diagram showing a base station and UE in more detail, according to one embodiment.

FIG. 2 is a block diagram showing the base station 100 and UE 102*a* of FIG. 1 in more detail. The base station 100 includes a grant-free transmission module 104 for processing grant-free transmissions received from UEs 102*a-c* and for participating in the HARQ methods described herein relating to the received grant-free transmissions. For example, the grant-free transmission module 104 may perform operations such as activity detection to obtain the MA signature of an uplink transmission, determining the redundancy version (RV) of an uplink transmission, HARQ combining to decode an encoded packet, generating HARQ feedback (e.g. ACK or NACK), identifying whether the uplink transmission is an initial transmission or a retransmission, etc. The grant-free transmission module 104 may include a grant-free transmission decoder 206 to perform at least some of the operations of the grant-free transmission module 104. The base station further includes an encoder 210 for encoding information, such as HARQ feedback, destined for the UEs 102a-c. The base station 100 also includes one or more antennas 208 for receiving grant-free uplink transmissions from the UEs 102a-c and sending messages to the UEs 102a-c in the downlink. Only one antenna 208 is illustrated. Although not illustrated, the one or more antennas are coupled to a transmitter and a receiver, which may be implemented as a transceiver. The base station 100 further includes memory 204. The base station 100 further includes other components for operation, e.g. to implement the physical layer, but these have been omitted for the sake of clarity.

The grant-free transmission module 104 and its components (e.g. the grant-free transmission decoder 206), as well as the encoder 210, may be implemented by one or more processors that execute instructions that cause the one or more processors to perform the operations of the encoder 210 and the grant-free transmission module 104 and its components. Alternatively, the encoder 210 and the grant-free transmission module 104 and its components may be implemented using dedicated integrated circuitry, such as an application specific integrated circuit (ASIC), a graphics processing unit (GPU), or a programmed field programmable gate array (FPGA) for performing the operations of the encoder 210 and the grant-free transmission module 104 and its components.

The UE 102a also includes a complementary grant-free transmission module 106 for generating and sending grant-free messages and for participating in the HARQ methods described herein related to the grant-free messages. For example, the grant-free transmission module 106 may perform operations such determining the MA signature and/or RV to use for an uplink transmission, encoding the packet based on the RV, processing HARQ feedback (e.g. ACK or NACK), sending retransmissions, etc. The grant-free transmission module 106 includes a grant-free message generator 214 for generating the messages to be transmitted in grant-free uplink transmissions. Generating a grant-free message may include encoding, in encoder 219, the data to be transmitted in the message, and modulating the encoded data. The UE 102a further includes a decoder 218 for decoding information from the base station 100. The UE 102a further includes one or more antennas 216 for transmitting grant-free uplink transmissions and receiving messages from the base station 100 in the downlink. Only one antenna 216 is illustrated. Although not illustrated, the one or more antennas are coupled to a transmitter and a receiver, which may be implemented as a transceiver. The UE 102a further includes memory 212. The UE 102a further includes other components for operation, e.g. to implement the physical layer, but these have been omitted for the sake of clarity.

The grant-free transmission module 106 and its components (e.g. the grant-free message generator 214), as well as the decoder 218, may be implemented by one or more processors that execute instructions that cause the one or more processors to perform the operations of the decoder 218 and the grant-free transmission module 106 and its components. Alternatively, the decoder 218 and the grant-free transmission module 106 and its components may be implemented using dedicated integrated circuitry, such as an ASIC, GPU, or a programmed FPGA for performing the operations of the decoder 218 and the grant-free transmission module 106 and its components.

Example Message Formats for Grant-Free Uplink Transmissions

Figure 3:
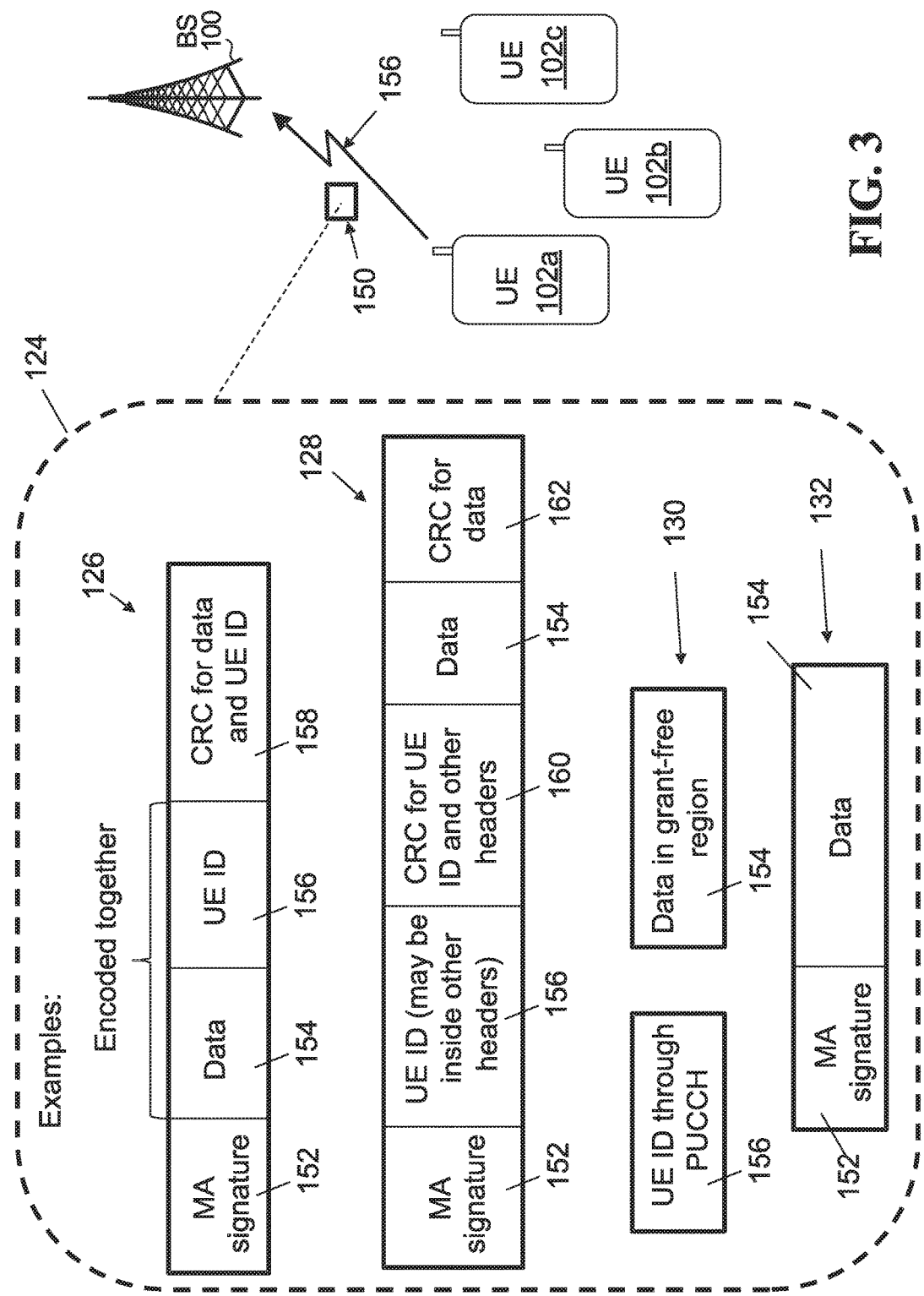
FIG. 3 illustrates example formats for a grant-free uplink transmission.

FIG. 3 illustrates example formats for the message 150 sent by UE 102a in the grant-free uplink transmission of FIG. 1. The example formats are shown in stippled bubble 124.

In example 126, the message 150 includes a MA signature 152, as well as data 154 and a UE ID 156. The UE ID 156 is information used by the base station 100 to identify the UE. In example 126, the data 154 and the UE ID 156 are encoded together, and a corresponding cyclic redundancy check (CRC) 158 is generated and included in the message 150. In some embodiments, the UE ID 156 is instead embedded (e.g. scrambled) in the CRC 158, which may reduce the payload size. If the UE ID 156 is scrambled in the CRC 158, then the UE ID may be a physical layer UE ID, such as a radio network temporary identifier (RNTI). The RNTI may be a cell-RNTI (C-RNTI) that is configured or assigned earlier by the network. If the UE ID 156 is embedded in the CRC 158, then the base station 100 needs to know the UE ID or perform blind detection using all potential UE IDs in order to decode the CRC 158.

Example 128 is a variation of example 126 in which the UE ID 156 is separately encoded from the data 154. Therefore, a separate CRC 160 is associated with the UE ID 156. In some embodiments, the UE ID 156 may be inside one or more other headers, in which case the CRC 160 is for the headers in which the CRC 160 is located. In example 128, the UE ID 156 may be transmitted with a lower modulation and coding scheme (MCS) than the data 154 in order to facilitate decoding of the UE ID 156. There may be situations in which the UE ID 156 is successfully decoded, but the data 154 is not successfully decoded.

In examples 126 and 128, the MA signature 152 is illustrated as occupying separate time-frequency resources from the data 154, e.g. at the start of the message 150. This may be the case if, for example, the MA signature 152 consists of a reference signal and/or a preamble. However, the MA signature 152 may instead be part of the transmission scheme itself, e.g. the codebook used or the mapping or interleaving pattern used, in which case the MA signature 152 would not occupy separate time-frequency resources from the data 154. Also, in embodiments in which the MA signature 152 does occupy separate time-frequency resources from the data 154, the resources do not necessarily have to be at the start of the message 150.

Example 130 in FIG. 1 shows a variation in which the UE ID 156 and the data 154 are transmitted through different resources. For example, the UE ID 156 may be transmitted as part of a control channel, such as a physical uplink control channel (PUCCH). The data 154 may be transmitted in a grant-free region of an uplink data channel. The MA signature is not illustrated in example 130, but the MA signature would be part of the data transmission.

In some other embodiments, the UE ID is not explicitly transmitted. For example, in some URLLC scenarios, based on the resource and reference signal configuration, detecting the reference signal along with the information about the grant-free resources may be enough to identify the UE. In this case, the UE ID does not need to be explicitly transmitted, and the base station 100 can identify the UE after successfully detecting the reference signal. An example is shown at 132. Only the MA signature 152 and the data 154 are included in the message, not a UE ID. The UE ID can be determined based on the MA signature 152 and the grant-free uplink resources used to send the message.

In some embodiments, there may be a preamble transmitted in a separate transmission resource as the data transmission. The time-frequency resources and MA signatures used for the data transmission may have a predefined mapping relationship with the preamble index.

When the UE sends message 150 to the base station 100, the base station 100 first attempts to detect the MA signature. MA signature detection may involve a blind detection process in which the MA signature is detected among all of the possible choices of MA signatures. Detecting the MA signature is referred to as activity detection. As an example, the MA signature in the grant-free uplink transmission may be a reference signal, and activity detection by the base station would therefore comprise detecting the reference signal in the grant-free uplink transmission. As another example, the MA signature in the grant-free uplink transmission may be a combination of the reference signal and the codebook or signature used by the UE in the grant-free uplink transmission, and activity detection by the base station would therefore comprise detecting the combination of the reference signal and codebook/signature used in the grant-free uplink transmission.

By successfully performing activity detection, the base station 100 knows that a UE has sent a grant-free uplink transmission. However, successful activity detection may or may not reveal the identity of the UE to the base station 100. If there is a unique mapping between a UE and an MA signature (e.g. for a given MA physical resource each UE has been assigned to use a different MA signature), then successful activity detection reveals the identity of the UE that sent the grant-free uplink transmission. Otherwise, in general, successful activity detection does not reveal the identity of the UE that sent the grant-free uplink transmission, although it may reveal that the UE is from a particular group of UEs, if different groups of UEs are assigned different MA signatures. In some embodiments, activity detection may further include obtaining the UE ID, e.g. if the UE ID is encoded separately from the data 154, as in example message 128.

After activity detection is successful, the base station 100 then attempts to perform channel estimation based on the MA signature and optionally additional reference signals multiplexed with the data message, and then decode the data 154. If data decoding is also successful, then the base station 100 can send an acknowledgement (ACK) to the UE in the downlink indicating that the base station 100 has successfully decoded the data 154. In embodiments in which successful activity detection does not reveal the identity of the UE, then successful decoding of the rest of the message 150 will reveal the identity of the UE, in which case the base station 100 will know the UE to which to send the ACK. If data decoding is not successful, then a negative acknowledgement (NACK) may be sent by the base station, possibly with a grant for a retransmission. As discussed in more detail later, in some embodiments a NACK is not sent if decoding of the data was unsuccessful. As also discussed in more detail later, in some embodiments, if a NACK is sent, the NACK may not necessarily include information that can uniquely identify the UE to which the NACK is being sent because the base station may not be able to uniquely identify the UE.

The ACK/NACK may be broadcast on the downlink or sent in a dedicated downlink transmission to the UE. The ACK/NACK may be sent in a downlink control channel, e.g. as part of downlink control information (DCI). In some embodiments, the ACK/NACK may be sent in a dedicated downlink acknowledgement channel (e.g. a physical HARQ indicator channel (PHICH)). Different configurations for the ACK/NACK are described later.

In one example, the MA signature 152 in example 126 is a reference signal. The base station 100 may first successfully perform activity detection by successfully decoding the reference signal sequence. The reference signal sequence may then be used by the base station 100 for channel estimation of the uplink channel 156. To facilitate successful decoding of the reference signal, the reference signal may be transmitted with a low MCS. Once the reference signal is successfully decoded and channel estimation performed, the base station 100 then decodes the payload having the data 154 and UE ID 156. The base station 100 can then read the UE ID 156 to be informed of which UE the grant-free transmission came from. The base station 100 can then send an ACK to the UE in the downlink indicating that the base station 100 has successfully decoded the data 154.

UE Identification by the Base Station

The grant-free uplink transmission may include a UE ID, e.g. UE ID 156 in FIG. 3. The UE ID is information used by the base station 100 to identify the UE.

As mentioned above, in some embodiments, the UE ID may be an RNTI, or may be based on an RNTI.

In some embodiments, the UE ID may be an index. The index distinguishes the UE from other UEs that are also permitted to send grant-free uplink transmissions on the same grant-free uplink resources. For example, the index may distinguish the UE from other UEs that are also permitted to send grant-free uplink transmissions on a shared time-frequency region in the same time slot, transmission time interval (TTI), or subframe.

In some embodiments, the UE ID does not need to be identical or fixed across one cell or serving area. For example, if a particular UE is part of a group of ten UEs allowed to send grant-free uplink transmissions in uplink resource partition A, then the UE ID may be an index between 1 and 10, which distinguishes the UE from the other nine UEs in the group. The base station 100 uses the index and knowledge of which grant-free uplink resource partition was used to determine which particular UE sent the grant-free uplink transmission.

In some embodiments, for a given MA physical resource, the UEs using that MA physical resource for grant-free uplink transmissions are assigned different MA signatures. The base station 100 may then uniquely identify the UE that sent the grant-free uplink transmission based on the combination of the MA signature and the MA physical resource used.

In some embodiments, for a given MA physical resource, some of the UEs using that MA physical resource for grant-free uplink transmissions may use the same MA signature. A UE index may be assigned by the base station 100 to differentiate between UEs that use the same MA signature. For example, if two UEs both use the same MA signature, then one of the UEs may be assigned UE index "1" as their UE ID, and the other UE may be assigned UE index "2" as their UE ID. The indices "1" and "2" may be reused for other UEs sharing a same MA signature. Then, the base station 100 uses the combination of the MA physical resource, the MA signature, and the UE index to identify the UE that sent the grant-free uplink transmission.

In some embodiments, each UE may be assigned the use of a different MA signature that is known by the base station 100 and the UE. The assignment may change over time. For example, a UE may be assigned a first MA signature, and then at a later time the UE may be assigned another MA signature. The MA signature received and the time-frequency resource used may uniquely identify the UE.

In some embodiments, a particular UE may be assigned multiple MA signatures, e.g. a first MA signature for initial transmissions and a second MA signature for retransmissions. In some embodiments, the MA signature assigned to each UE of a group of UEs may change over time according to a hopping pattern. In some embodiments, the assignment of MA signatures to UEs may be reused or repeated for different UEs in different grant-free uplink resource partitions. For example, a first group of UEs may be assigned to a first partition of uplink resources for sending their grant-free uplink transmissions. Each UE of the first group of UEs may be assigned a different MA signature. A second group of UEs may be assigned to a second partition of uplink resources for sending their grant-free uplink transmissions. Each UE of the second group of UEs may be assigned a different MA signature. The MA signatures in the first group may overlap with the MA signatures in the second group, such that to uniquely identify the UE, the base station 100 must know both the MA signature of the uplink transmission and the partition of uplink resources used to send the grant-free uplink transmission. For example, the base station 100 may use the detected MA signature 152 and an index corresponding to the grant-free uplink resource partition used to check a lookup table to determine the identity of the UE that sent the grant-free uplink transmission.

In embodiments in which the base station 100 can determine the identity of the UE without the UE ID 156, then the UE ID 156 may not even need to be transmitted as part of the message 150.

In summary, various possibilities exist in implementation to allow for the base station 100 to uniquely identify the UE that sent the grant-free uplink transmission. For example, if only one UE is able to use a particular grant-free uplink resource, then the use of that grant-free uplink resource uniquely identifies the UE. As another example, when there is a unique mapping of MA signatures to UEs for a particular resource region, then the MA signature may uniquely identify a UE in that resource region. As another example, when a UE ID is present in the uplink message and successfully decoded by the base station, the UE ID itself may uniquely identify the UE, or the UE ID in combination with another piece of information (e.g. the grant-free uplink resource used) may uniquely identify the UE.

HARQ for Grant-Free Uplink Transmissions

HARQ may be performed for the grant-free uplink transmissions. For example, the UE may send a packet of encoded data (such as a transport block) via an initial grant-free uplink transmission. If the encoded data 154 in the initial grant-free uplink transmission is not successfully decoded by the base station 100, then a retransmission may be performed by the UE. The retransmission may include a retransmission of the encoded data and/or further information for decoding the encoded data. For example, the retransmission data may include some or all of the original encoded data and/or parity information. The base station 100 may perform HARQ combining as follows: instead of discarding unsuccessfully decoded initial data, the unsuccessfully decoded initial data may be stored at the base station 100 in memory and combined with received retransmission data to try to successfully decode the encoded data. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). When data is encoded in the grant-free message generator 214, the encoded bits may be partitioned into different sets (that possibly overlap with each other). Each set is a different RV. For example, some RVs may have more parity bits than other RVs. Each RV is identified by an RV index (e.g. RV 0, RV 1, RV 2, . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder (not illustrated) in the grant-free message generator 214 in the UE 102a may perform the channel coding.

In one embodiment, the channel coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the grant-free uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The base station 100 uses knowledge of the RV to perform decoding. For chase combining, the RV of the initial and retransmissions may be the same, e.g. RV 0. For incremental redundancy, the retransmissions may use a higher RV that may follow a fixed pattern, e.g. RV 0 for the initial transmission, RV 2 for the first retransmission, RV 3 for the second retransmission, and RV 1 for the third retransmission. Therefore, in order to decode the packet, it may be necessary for the base station 100 to know the RV index of the data being received in a grant-free uplink transmission, unless there is only one predefined RV.

As part of the HARQ procedure for a grant-free uplink transmission, an ACK may be sent by the base station 100 when the base station 100 successfully decodes the encoded data sent via the grant-free uplink transmission. In some embodiments, a NACK may be sent by the base station 100 when the data is not successfully decoded. However, a NACK may not always be sent, e.g. in "NACK-less" HARQ schemes in which the absence of an ACK within a predetermined period of time is interpreted as a NACK. In some embodiments, an ACK may not always be sent, e.g., in "ACK-less" HARQ schemes in which the absence of a NACK or explicit grant for retransmission within a predetermined period of time is interpreted as an ACK, or is interpreted as an indication to not perform any retransmissions.

In some embodiments, an ACK may be associated with a UE ID that identifies the UE the ACK is meant for. If the MA signature and uplink grant-free resource region used can together uniquely identify the UE, then the ACK may instead be associated with an index identifying the MA signature. The UE knows the ACK is meant for it based on a matching MA signature index. A NACK, if sent, may be associated with a UE ID when the UE ID is successfully decoded by the base station. Alternatively, the NACK may be associated with an index identifying the MA signature corresponding to the uplink transmission being NACK'd, assuming successful activity detection by the base station. Otherwise, the NACK may not be associated with a UE ID or a MA signature.

Retransmissions and Mapping to MA Signatures

If the data in the initial grant-free uplink transmission is not successfully decoded by the base station, then a retransmission may be performed by the UE. In some embodiments, the MA signature used in the grant-free uplink transmission may identify whether the transmission is an initial transmission or a retransmission. In some embodiments, the MA signature may also or instead be used to identify the UE that send the transmission.

As a first example, FIG. 4 illustrates three tables 302, 304, and 306, showing different mappings. In table 302, the MA signature is a reference signal. A pool {P} of nine reference signals (i.e. nine MA signatures) are partitioned into three sets {P1}, {P2}, and {P3}. The reference signals may be pilots. Each row in table 302 represents a 3-tuple. In this example, the pool {P} is divided into three exclusive sets {P1}, {P2}, and {P3}, such that each set has three of the nine reference signals. Specifically, {P1} includes reference signals p11, p12, and p13, {P2} includes reference signals p21, p22, and p23, and {P3} includes reference signals p31, p32, and p33. Three of the nine reference signals are designated as initial reference signals, another three of the nine reference signals are designated as first retransmission reference signals, and the last three of the nine reference signals are designated as second retransmission reference signals. The specific mapping in table 302 is only an example, and the mapping may change over time and/or may only be for a particular grant-free uplink resource partition (e.g. there may be a different mapping in a different MA physical resource). In the example in table 302, UE 102a is assigned tuple index 1, UE 102b is assigned tuple index 2, and UE 102c is assigned tuple index 3. Therefore, when the base station 100 performs successful activity detection (i.e. successfully decodes the reference signal), then the base station 100 uses the reference signal sequence to determine which UE sent the grant-free uplink transmission. In the example in table 302, each reference signal sequence also indicates to the base station 100 whether the grant-free uplink transmission is an initial transmission, a first retransmission, or a second retransmission. In the example of table 302, the reference signal can be used to identify both the initial and retransmission as well as the UE identity. For example, reference signal p11, p21 or p31 may indicate the grant-free packets are transmitted by UE 102a. In alternative embodiments, there may still be a unique mapping between reference signals and UEs, but the reference signals may only be mapped to the identity of the UE and not mapped to initial transmissions or retransmission. For example, reference signal p11 may be assigned to a first UE, reference signal p12 may be assigned to a second UE, . . . , and reference signal p33 may be assigned to a ninth UE. Each of the nine UEs may then use their same assigned reference signal for their initial transmissions and retransmissions.

Table 304 is the same as table 302, except that the MA signature is a sparse code multiple access (SCMA) codebook. Nine SCMA codebooks {A1, A2, A3, B1, B2, B3, C1, C2, and C3} are partitioned into initial and retransmission sets and assigned to each one of UEs 102a-c. For example, the use of codebook A1 indicates to the base station 100 that UE 102a sent the transmission, and that the transmission is an initial data transmission. In some embodiments, there may also be a fixed, semi-persistent, or dynamic association between certain reference signals and SCMA codebooks. In such embodiments, the reference signal sequence or the SCMA codebook may be used to identify the UE and/or whether the transmission is an initial transmission, a first retransmission, or a second retransmission. In some embodiments, one SCMA codebook may be associated with multiple reference signals. In such embodiments, identifying the reference signal sequence reveals the SCMA codebook used. In some embodiments, the SCMA codebook may have a one-to-one association with the reference signal. In such embodiments, identifying the reference signal sequence reveals the SCMA codebook used and vice versa.

Table 306 is also the same as table 302, except instead of MA signatures, there is an assigned mapping between physical uplink resources used for the grant-free transmissions and initial transmissions and retransmissions and UEs. Nine different time-frequency locations {A1, A2, A3, B1, B2, B3, C1, C2, and C3} are partitioned into initial and retransmission sets and assigned to each one of UEs 102a-c. For example, the receipt, by base station 100, of a grant-free uplink transmission on physical uplink resources A1 indicates to the base station 100 that UE 102a sent the transmission, and that the transmission is an initial data transmission.

In each table shown in FIG. 4, there happens to be a unique mapping between MA signatures tuples or physical resources tuples and the UEs. However, in some embodiments there does not have to be any unique mapping to UEs. The base station does not have to assign UEs to particular tuples. More generally, the mapping relationship between the different MA signatures or physical resources, i.e. the tuples in the tables in FIG. 4, may be used to identify that the initial transmission and the retransmissions belong to the same packet. For example, UE 102a may randomly select index tuple 1 in table 302 (p11, p21, p31) for a first data packet being transmitted to the base station 100, and UE 102a may randomly select index tuple 2 (p12, p22, p32) for a second data packet being transmitted to the base station 100. In some embodiments, a UE may choose or be configured to use different tuples for different packets. In some embodiments, two UEs may choose the same tuple, e.g. if they randomly select MA signatures for the initial transmission, which may occur in mMTC applications.

In some embodiments, there may be a first MA signature used for an initial transmission of a packet, and a second MA signature used for all K retransmissions of that packet, where K is greater than or equal to one. For example, table 308 in FIG. 5 illustrates an example in which the MA signatures are reference signals. A pool {P} of eight reference signals are partitioned into two sets {P1} and {P2}. The reference signals may be pilots. Each row in table 308 represents a 2-tuple. The 2-tuples are not uniquely assigned to particular UEs, rather each UE of a group of UEs may randomly select which 2-tuple to use. {P1} is a pool of initial transmission reference signals and includes reference signals p11, p12, p13, and p14. {P2} is a pool of retransmission reference signals and includes reference signals p21, p22, p23, and p24. When a UE is to transmit a packet using a grant-free uplink transmission, the UE uses one of the four 2-tuples. The 2-tuple used indicates which reference signal is used for the initial transmission and which reference signal is used for any and all K retransmissions. For example, if UE 102a uses the 2-tuple indicated by index 2 for transmitting a packet, then the reference signal used for the initial transmission of the packet is p12, and the reference signal used for any and all retransmissions of the packet is p22.

In the embodiment described above in relation to FIG. 5, the MA signature used identifies whether the grant-free uplink transmission is an initial transmission of data or a re-transmission of the data. However, if K>1, then the retransmission MA signature does not reveal whether it is a first retransmission, second retransmission, etc. since the same MA signature is used for all retransmissions of the data.

Redundancy Version Identification

In some embodiments, there may be a mapping between MA signatures and RVs that may allow the base station 100 to determine the RV of the grant-free uplink transmission, so that the RV does not have to be explicitly signalled. Different embodiments are explained below.

In one embodiment, the MA signature uniquely identifies the RV. For example, one of MA signatures "MA1" to "MA8" is used whenever an uplink transmission is sent having RV 0, one of MA signature "MA9" to "MA16" is used whenever an uplink transmission is sent having RV 1, one of MA signature "MA17" to "MA24" is used whenever an uplink transmission is sent having RV 2, etc. The mapping between MA signatures and RV is known in advance by both the UEs and the base station. In some embodiments, the mapping may change semi-statically and/or may be specific to the grant-free uplink resources and/or only apply to a subset of all UEs operating in grant-free mode.

In some embodiments, the tables discussed above in relations to FIGS. 4 and 5 may be used to additionally or instead identify RV. For example, FIG. 6 illustrates three tables 352, 354, and 356, showing different mappings. In table 352, the MA signature is a reference signal. A pool {P} of nine reference signals (i.e. nine MA signatures) are partitioned into three sets {P1}, {P2}, and {P3}. The reference signals may be pilots. Each row in table 352 represents a 3-tuple. In this example, the pool {P} is divided into three exclusive sets {P1}, {P2}, and {P3}, such that each set has three of the nine reference signals. Specifically, {P1} includes reference signals p11, p12, and p13, {P2} includes reference signals p21, p22, and p23, and {P3} includes reference signals p31, p32, and p33. {P1} maps to RV 0, i.e. whenever a UE uses reference signal p11, p12, or p13 for its uplink transmission, the data in the uplink transmission has RV 0. {P2} maps to RV 1, i.e. whenever a UE uses reference signal p21, p22, or p23 for its uplink transmission, the data in the uplink transmission has RV 1. {P3} maps to RV 2, i.e. whenever a UE uses reference signal p31, p32, or p33 for its uplink transmission, the data in the uplink transmission has RV 2. Each pilot pool may also be associated with the transmission, e.g. {P1} is used for initial transmissions, {P2} is used for the first retransmission, and {P3} is used for the second retransmission, like in table 302 of FIG. 4. When a base station receives an uplink transmission having a particular reference signal, the base station knows from the reference signal the RV of the uplink transmission. The base station also knows the tuple the reference signal is in and can therefore identify the other transmissions of the encoded data to perform HARQ combining. For example, if the base station receives an uplink transmission having reference signal p21, the base station knows that the uplink transmission has RV 1 and is a first retransmission of an initial transmission previously received having p11. The specific mapping in table 352 is only an example, and the mapping may change over time and/or may only be for a particular grant-free uplink resource partition (e.g. there may be a different mapping in a different MA physical resource). In the example in table 352, UE 102a is assigned tuple index 1, UE 102b is assigned tuple index 2, and UE 102c is assigned tuple index 3. Therefore, when the base station 100 performs successful activity detection (i.e. successfully decodes the reference signal), then the base station 100 can also use the reference signal to determine which UE sent the grant-free uplink transmission. Therefore, in some embodiments, the MA signature (e.g. the reference signal) may indicate to the base station the UE that sent the uplink transmission, whether the uplink transmission is an initial transmission, a first retransmission, or a second retransmission, and which RV is used in the uplink transmission. In an alternative embodiment, each UE is not assigned a tuple, but instead randomly selects a tuple, e.g. UE 102a may randomly select tuple index 1. In another embodiment, each UE may be assigned more than one tuple, and each UE uses one of its assigned tuples for each packet of encoded data the UE transmits to the base station.

Table 354 is the same as table 352, except that the MA signature is an SCMA codebook. Also, specific UEs are not assigned to specific tuples. Nine SCMA codebooks {A1, A2, A3, B1, B2, B3, C1, C2, and C3} are partitioned into three sets: {A1, A2, A3} which corresponds to RV 0; {B1, B2, B3} which corresponds to RV 1; and {C1, C2, C3} which corresponds to RV 1. Therefore, the SCMA codebook used indicates the RV. In some embodiments, the SCMA codebook may also identify the UE and/or whether the uplink transmission is an initial transmission or a first retransmission or a second retransmission. Table 356 is the same as table 354, except instead of MA signatures, there is an assigned mapping between physical uplink resources used for the grant-free transmissions and RVs. Nine different time-frequency locations {A1, A2, A3, B1, B2, B3, C1, C2, and C3} are partitioned into three sets: {A1, A2, A3} which corresponds to RV 0; {B1, B2, B3} which corresponds to RV 1; and {C1, C2, C3} which corresponds to RV 1. Therefore, the physical uplink resource used indicates the RV.

Figures 7, 8:
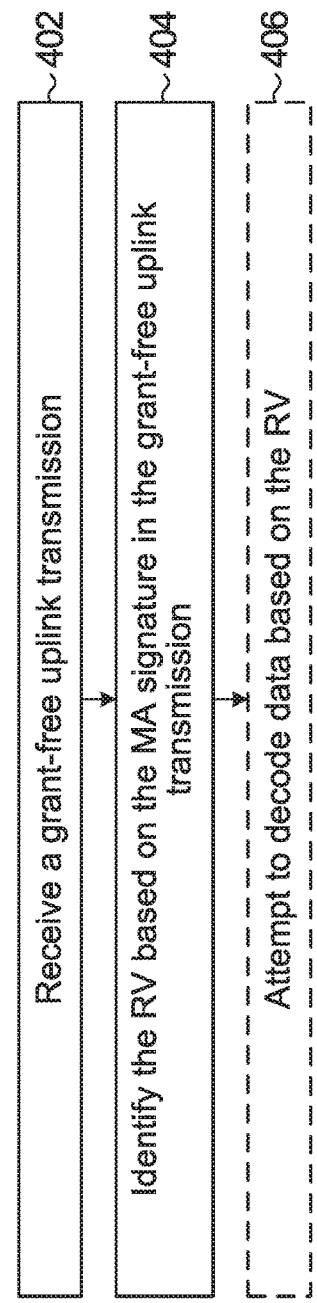

In some embodiments, there may be a first MA signature used for an initial transmission of a packet, and a second MA signature used for all K retransmissions of that packet. A first RV may always be used for the initial transmission, but the retransmissions may use different RVs. For example, table 358 in FIG. 7 illustrates an example in which the MA signatures are reference signals. A pool {P} of eight reference signals are partitioned into two sets {P1} and {P2}. The reference signals may be pilots. Each row in table 358 represents a 2-tuple. The 2-tuples are not uniquely assigned to particular UEs, rather each UE of a group of UEs may randomly select which 2-tuple to use. In an alternative embodiment, the 2-tuples may instead be assigned to UEs, e.g. uniquely assigned to UEs. Each packet of data to be sent by a UE uses one tuple. {P1} is a pool of initial transmission reference signals and includes reference signals p11, p12, p13, and p14. All initial transmissions use RV 0. {P2} is a pool of retransmission reference signals and includes reference signals p21, p22, p23, and p24. The RV used depends upon whether the retransmission is a first retransmission, a second retransmission, or a third retransmission. When a UE is to transmit a packet using a grant-free uplink transmission, the UE uses one of the four 2-tuples. The 2-tuple used indicates which reference signal is used for the initial transmission and which reference signal is used for any and all K retransmissions. For example, if UE 102a uses the 2-tuple indicated by index 2 for transmitting a packet, then the reference signal used for the initial transmission of the packet is p12, and the reference signal used for any and all retransmissions of the packet is p22. The same tuple is used for the same packet. The base station therefore knows whether the received uplink transmission is an initial transmission or a retransmission based on the reference signal sequence used in the uplink transmission. If the uplink transmission is an initial transmission, then the base station knows the RV (RV 0). If the uplink transmission is a retransmission, then the base station does not know the RV unless the base station knows whether it is a first retransmission, a second retransmission, or a third retransmission and also if there is a predefine relationship between the number of transmissions/retransmissions and the RV index (as there is in FIG. 7). The base station may be able to determine whether it is a first, second, or third retransmission by looking at the previous unsuccessfully decoded uplink transmissions associated with that tuple and stored in the memory of the base station and/or based on the time order of receiving the packets associated with the same MA signature tuple.

For example, the base station may receive an uplink transmission having p11. The base station knows the uplink transmission is an initial transmission because of the presence of p11. The base station also knows the RV of the data in the initial transmission because of the presence of p11 (which maps to RV 0). The initial transmission is unsuccessfully decoded, and so the partially decoded data is stored in memory. The base station then receives another uplink transmission that uses p21. The base station knows that the uplink transmission is a retransmission because of the presence of p21. The base station queries its memory and determines that there is only an initial transmission (associated with p11), and so the base station decides that the retransmission must be a first retransmission. The base station therefore knows the RV of the retransmission because all first retransmissions using p21 are mapped to RV 1. The base station HARQ combines the first retransmission with the initial transmission but is still unable to successfully decode the packet. The partially decoded data relating to the first retransmission is also stored in memory. The base station then receives another uplink transmission that uses p21. The base station knows that the uplink transmission is a retransmission because of the presence of p21. The base station queries its memory and determines that there is already one earlier retransmission having p21, which is also associated with an initial transmission having p11. The base station therefore decides that the received retransmission must be a second retransmission. The base station therefore knows the RV of the retransmission because all second retransmissions using p21 are mapped to RV 2. The base station HARQ combines the second retransmission, the first retransmission, and the initial transmission, and is able to successfully decode the packet.

In another embodiment, it may be preconfigured that each grant-free uplink transmission can use only one of two RVs (e.g. RV 0 or RV 1). A first MA signature is mapped to a first RV, such that when the base station receives the first MA signature, the base station knows that the data of the grant-free uplink transmission has the first RV. A second MA signature is mapped to a second RV, such that when the base station receives the second MA signature, the base station knows that the data of the grant-free uplink transmission has the second RV. As a more specific example: each grant-free uplink transmission can use only one of two RVs; when a UE is to transmit a packet using a grant-free uplink transmission, the UE uses one of the four 2-tuples of FIG. 5; the MA signature in the 2-tuple that is used for the initial transmission is mapped to the first RV, and the MA signature in the 2-tuple that is used for the retransmission(s) is mapped to the second RV. Then, when the base station 100 receives a grant-free uplink transmission, the base station 100 knows from the MA signature used whether the grant-free uplink transmission is an initial transmission or retransmission of the data, and what the RV is for the data in the grant-free uplink transmission.

In some embodiments, uplink time-frequency resources are configured in advance for a UE, e.g. a known resource hopping pattern, such as in a first TTI a UE is to use time-frequency resources 'A', in a second TTI, the UE is to use time-frequency resources 'B', in a third TTI the UE is to use time-frequency resources 'C', etc. In some embodiments, there may be a known mapping between the uplink time-frequency resources used and the RV used in the uplink transmission, e.g. an uplink transmission by the UE in time-frequency resources 'A' uses RV 0, an uplink transmission by the UE in time-frequency resources 'B' uses RV 1, etc. In other embodiments, there may instead be a known mapping between the MA signature used in the uplink transmission and the RV used, e.g. as in table 352 of FIG. 6.

In one embodiment, the uplink time-frequency resources are configured in advance as a resource hopping pattern, and the RV is determined using the mapping in table 358 of FIG. 7. Even though the uplink time-frequency resources are configured in advance for the UE, the base station may not know from the uplink time-frequency resource used whether the uplink transmission is an initial transmission or a retransmission. However, the base station can determine whether the uplink transmission is an initial transmission or a retransmission based on the reference signal used, as per table 358 in FIG. 7. If the uplink transmission is an initial transmission, then the base station knows the RV. If the uplink transmission is a retransmission, then the base station can determine the RV once the base station determines whether the retransmission is a first or second or third retransmission, assuming there is a predefined relationship between the number of transmissions/retransmissions and the RV index (e.g. as there is in FIG. 7). The base station may determine whether the retransmission is a first or second or third retransmission in part using the resource hopping pattern, e.g. if the initial transmission was sent two hops earlier, and a first retransmission was sent one hop earlier, then the present retransmission is a second retransmission.

In other embodiments, the time slot (or subframe or TTI or time duration) used by the UE to send the grant-free uplink transmission may correspond to a respective RV based on a mapping known to both the UE and the base station. As a result, the time slot (or subframe or TTI or time duration) during which the grant-free uplink transmission is received by the base station therefore reveals to the base station the RV used in the transmission. For example, it may be configured in advance that when sending a grant-free uplink transmission in an odd time slot, the UE uses RV 0, and when sending a grant-free uplink transmission in an even time slot, the UE uses RV 1.

In some embodiments, there is a fixed mapping between the number of transmissions of the same packet and the RV. In these embodiments, the identity of the number of the transmissions for the packet also identifies the RV.

FIG. 8 is a method performed by base station 100, according to one embodiment. In step 402, the base station receives a grant-free uplink transmission from UE 102a. The grant-free uplink transmission utilizes an MA signature, and the grant-free uplink transmission carries encoded data having an RV. In step 404, the base station 100 detects the MA signature and identifies the RV of encoded data in the grant-free uplink transmission based on the MA signature. Optionally, in step 406, the base station 100 attempts to decode the encoded data in the grant-free uplink transmission based on the RV. In some embodiments, the grant-free uplink transmission is not an initial transmission of the packet, but is a retransmission of the packet, in which case step 406 comprises combining data from the retransmission with data from one or more previous transmissions of the packet to try to decode the packet.

Step 404 may include using the MA signature to determine whether the grant-free uplink transmission is an initial transmission of the encoded data or a retransmission of the encoded data, and then obtaining the RV based on both the grant-free uplink resource used by the UE and the determination of whether the grant-free uplink transmission is an initial transmission of the encoded data or a retransmission of the encoded data.

ACK/NACK Communication

When the base station 100 successfully decodes the encoded data being sent via a grant-free uplink transmission, an ACK may be sent to the UE. In some embodiments, a NACK may be sent from the base station 100 when the data is not successfully decoded. Methods for communicating the ACK and/or NACK from the base station 100 to the UEs 102a-c are described below.

In a first possible scenario, one or more of the UEs 102a-c each send respective data to the base station 100 in a respective grant-free uplink transmission. The respective grant-free uplink transmissions may or may not be transmitted using the same resources. In any case, the base station 100 successfully decodes all of the transmitted data. Therefore, ACK message(s) is/are sent from the base station 100. In one embodiment, a separate ACK is transmitted from the base station 100 for each UE that sent uplink data in a grant-free uplink transmission. Each ACK is coupled with information uniquely specifying the UE to which the ACK belongs. For example, each ACK may be associated with a UE ID (e.g. an index identifying the UE). As another example, if the identity of the UE can be determined using the identity of the MA signature, then each ACK may be associated with an index identifying the MA signature of the uplink transmission being acknowledged. Each UE knows which MA signature it used to send its transmission, and each UE also know other information, such as which MA physical resource was used. Therefore, each UE will know which ACK is for the UE by using the indication of the MA signature, possibly coupled with other information, such as knowledge of the MA physical resource used. Depending on the mapping between UEs and MA signatures, then a UE ID may not even be needed. In some embodiments, the base station 100 may transmit the ACK(s) on a dedicated downlink acknowledgement channel (e.g. a PHICH). There may be a known mapping between the fields of the downlink acknowledgement channel and the uplink grant-free resources. A field of the downlink acknowledgement channel may be a time-frequency location of the downlink acknowledgement channel and/or a sequence used in the downlink acknowledgement channel. For example, the sequences used in the downlink acknowledgement channel may be four orthogonal codes, which can be mapped to four different MA signatures. For example, if UE 102a used time-frequency location A to send its grant-free uplink transmission, then the ACK for UE 102a is sent at time-frequency location B in the downlink acknowledgement channel. As another example, if UE 102a used time-frequency location A to send its grant-free uplink transmission, then the ACK for UE 102a is sent using code sequence C. In other embodiments, there may be a known mapping between the fields in the downlink acknowledgement channel and the UE ID. For example, any ACK for UE 102a is always sent at time-frequency location D and/or using sequence E in the downlink acknowledgement channel. In other embodiments, there may be a known mapping between the fields in the downlink acknowledgement channel and the MA signature. For example, whenever MA signature p11 is used for a grant-free uplink transmission, then any ACK corresponding to that uplink transmission is always sent at time-frequency location F and/or using sequence G in the downlink acknowledgement channel.

In some embodiments, the base station 100 may transmit an ACK without any UE information. If a UE that sent a grant-free uplink transmission subsequently sees the ACK, then the UE assumes that the data of its grant-free uplink transmission was successfully decoded.

In some embodiments, the base station 100 may transmit a group ACK. The group ACK may comprise a single ACK payload protected by a CRC. The payload may include an aggregation of all UE IDs or MA signatures corresponding to uplink transmissions that have been successfully decoded and are acknowledged by the base station 100. Each UE that sent a grant-free uplink transmission then decodes the group ACK to see if matching UE ID or MA signatures can be found in the group ACK payload and whether its grant-free uplink transmission was acknowledged. In some embodiments, a group ACK may be associated with a temporal group ID. The group ID may be derived from the grant-free resources. For example, if a group of UEs all use uplink resources C to respectively send a grant-free uplink transmission, then that group of UEs may be associated with a group ID corresponding to uplink resources C. In some embodiments, there may be a specific 1-bit field indicating that the ACK is a group ACK, and the location of time and frequency resources of the ACK is directly linked to the grant free transmission resources and a group ID may not be necessary. In some embodiments, there may be a reserved field (e.g. time-frequency location) in the downlink for sending a group ACK. The time-frequency location of the reserved field may be determined based on the location of the uplink resources used for the grant-free uplink transmissions. For example, if a group of UEs each send their grant-free uplink transmission within time-frequency region A, then the reserved field for the group ACK may be at time-frequency location B. The group ACK may be one bit: "0" for ACK and "1" for N/A, or vice versa. The bit value corresponding to "N/A" would be sent when no ACK needs to be transmitted by the base station 100.

In another possible scenario, one or more of the UEs 102a-c each send respective data in a respective grant-free uplink transmission, and the base station 100 successfully performs activity detection, but all decoding of the data fails. For example, if the MA signatures are reference signals, then reference signal detection may be successfully performed, but data decoding may still fail. Reference signal detection may be successful due to the following possible reasons: (1) there may be no collision of the reference signals, and any reference signal errors due to noise in the channel and interference from other reference signals are corrected because of the more robust MCS of the reference signal sequence; or (2) there may be reference signal collision, but any reference signal errors due to the collision and channel noise are corrected because of the more robust MCS of the reference signal sequence; or (3) due to the orthogonal characteristics among reference signals. Because activity detection was successful, but data decoding was unsuccessful, NACK message(s) may be sent from the base station 100.

In one embodiment, a separate NACK is transmitted from the base station 100 for each uplink transmission for which data decoding failed. Each NACK may be associated with UE identifying information. For example, each NACK may be associated with an index identifying the MA signature of the uplink transmission corresponding to the NACK. A UE may be able to determine that the NACK belongs to it based on the MA signature identification coupled to the NACK, and possibly other information, such as which MA physical resource was used. If there is not a unique mapping between UEs and MA signatures for a given MA physical resource, then any UE using a particular MA signature for the given MA physical resource will retransmit its data if a NACK is received that is associated with that particular MA signature. In such a situation, unnecessary uplink retransmissions may sometimes occur, e.g. if two UEs use the same MA signature, and the data from one UE is successfully decoded by the base station 100, and the data from another UE is not successfully decoded. The receipt of the NACK by both UEs will cause both UEs to retransmit the data even though one of the UEs does not need to retransmit its data.

In some embodiments, the variations described earlier for ACK can also be used for transmitting a NACK. As an example, the base station 100 may transmit the NACK(s) on a dedicated downlink acknowledgement channel, and there may be a known mapping between the fields in the downlink acknowledgement channel and the uplink resources used to send the uplink grant-free transmission. There may instead be a known mapping between the fields in the downlink acknowledgement channel and the UE ID or the MA signature used to send the uplink grant-free transmission. As another example, the base station 100 may transmit the NACK without any UE information. If a UE that sent a grant-free uplink transmission subsequently sees the NACK, then the UE assumes that the data of its grant-free uplink transmission was not successfully decoded. As another example, the base station 100 may transmit a group NACK. The group NACK may comprise a single NACK payload protected by a CRC. The payload may include an aggregation of all MA signatures corresponding to uplink transmissions that have been unsuccessfully decoded. The UE ID may be used instead of MA signatures if the UE ID is separate from the data, as in example 128 of FIG. 3. Each UE that sent a grant-free uplink transmission decodes the group NACK to see whether its grant-free uplink transmission resulted in a NACK. In some embodiments, a group NACK may be associated with a temporal group ID. The group ID may be derived from the grant-free resources. In some embodiments, there may be a specific 1-bit field indicating that the NACK is a group NACK, and a group ID may not be necessary. In some embodiments, there may be a reserved field (e.g. time-frequency location) in the downlink for sending a group NACK. The time-frequency location of the reserved field may be determined based on the location of the uplink resources used for the grant-free uplink transmissions. For example, if a group of UEs each send their grant-free uplink transmission within time-frequency region A, then the reserved field for the group NACK may be at time-frequency location B. The group NACK may be one bit: "0" for NACK and "1" for N/A, or vice versa. The bit value corresponding to "N/A" would be sent when no NACK needs to be transmitted by the base station 100. In another example, group NACK and group ACK may be used in the same time-frequency region A. The group NACK may be one bit: "0" for NACK and "1" for ACK, or vice versa.

In another possible scenario, one or more of the UEs 102a-c each send respective data in a respective grant-free uplink transmission, the base station 100 successfully performs activity detection, some data decoding is successful, and other data decoding fails. In one embodiment, an ACK is sent for each uplink data transmission that was successfully decoded by the base station 100. Each ACK is coupled with corresponding UE identifying information, e.g. the UE ID or a MA signature index identifying what MA signature was used in the uplink transmission. A NACK is also sent for each uplink data transmission that was unsuccessfully decoded by the base station 100. Each NACK may be coupled with corresponding UE identifying information, e.g. a MA signature index identifying what MA signature was used in the uplink transmission. In some embodiments, a single payload, protected by a CRC, may be transmitted from the base station 100. The payload may include an aggregation of ACK and/or NACK information for different uplink transmissions.

In some embodiments, each ACK or NACK may be associated with an index identifying the MA signature of the uplink transmission corresponding to the ACK or NACK. If there is not a unique mapping between UEs and MA signatures for a given MA physical resource, then when a NACK is sent an unnecessary uplink retransmission may sometimes occur. Similarly, there may be situations in which a UE's data is not successfully decoded by the base station 100, but the UE does not send a retransmission of the data, e.g. if two UEs use the same MA signature on the same uplink MA physical resource, and the data from one UE is successfully decoded by the base station 100, and the data from another UE is not successfully decoded. An ACK may be sent that identifies the MA signature. The receipt of the ACK by both UEs will cause both UEs to consider their data transmission to have been successfully decoded, even though one of the UEs should instead retransmit its data. In this situation, if the UE ID of the successfully decoded UE is identified, the BS may choose to send an ACK with UE ID instead of MA signature. The UE that is not decoded successfully may not be able to find the matching ID in the ACK field and therefore does not assume the transmission is successful. In some embodiments, if the base station receives two or more transmissions on the same uplink MA physical resources that are from different UEs having the same MA signature, then a NACK identifying the MA signature is always sent if at least one of the transmissions is unsuccessfully decoded. In such a method, having some UEs possibly unnecessarily retransmit successfully decoded data is favoured over having some UEs not retransmit unsuccessfully decoded data.

Regardless of the different scenarios discussed above, in some embodiments the base station 100 may not send NACKs for grant-free uplink transmissions. The UEs are configured to assume a NACK in the absence of an ACK. The following benefits may be achieved. Signaling may be saved by not sending NACKs. Also, ambiguities associated with sending a NACK may be eliminated. For example, if a NACK is being sent, then the UE ID associated with the NACK may not have been decoded by the base station 100. Therefore, the NACK may not be linked to a specific UE, thereby causing ambiguity as to which UE the NACK belongs. There may not always be a unique mapping between MA signatures and a UE, such that coupling the NACK with an MA signature index may not indicate to which UE the NACK belongs. Therefore, even with activity detection, there may be ambiguities due to the UE ID possibly not being available.

As discussed above, there may be a unique mapping between UEs and MA signatures, e.g. for a given uplink MA physical resource, each UE may be assigned a different reference signal. A unique mapping between UEs and MA signatures may be more feasible in URLLC applications compared to m-MTC applications, because in m-MTC applications there may be a very large number of UEs. In some applications, such as in some URLLC applications, the pool of possible MA signatures may be larger or equal to the pool of UEs performing grant-free uplink transmissions, thereby permitting a unique mapping between UEs and MA signatures for a given uplink MA physical resource. Another possible benefit of having a unique mapping between UEs and MA signatures for a given uplink MA physical resource, that was not mentioned above, is that MA signature collision may be avoided. For example, if the MA signature is a reference signal, then the reference signals of different UEs may not collide (particularly if the reference signals are orthogonal), thereby increasing the probability of successful activity detection at the base station 100. In some embodiments in which there is a unique mapping between UEs and MA signatures for a given uplink MA physical resource, the HARQ ACK/NACK feedback for a particular UE may be one bit that is multiplexed on a resource that is determined by the MA signature used by the UE. A bit value of "0" may indicate an ACK, and a bit value of "1" may indicate a NACK, or vice versa. For example, UE 102a may send its initial grant-free uplink transmission using reference signal p11 in table 302. Assuming successful activity detection, the base station 100 knows to send the ACK or NACK using a predetermined time-frequency location corresponding to reference signal p11. The UE 102a knows to look for the ACK or NACK at the predetermined time-frequency location because reference signal p11 was used. Therefore, there may be a reduction in NACK/ACK signaling compared to schemes in which more than one bit needs to be sent for each ACK/NACK. More generally, the ACK/NACK feedback may use a particular time-frequency location and/or a particular sequence or codebook in the downlink channel corresponding to the MA signature used to send the uplink transmission.

UE operation will now be described in more detail. In some embodiments, when the UE receives an ACK (or group ACK) with matching identifying information, then the UE assumes that the grant-free uplink transmission was successful, i.e. the data was successfully decoded by the base station 100. The matching identifying information may be a UE ID or the identification of a MA signature (e.g. a reference signal) corresponding to that used by the UE for the uplink transmission. In some embodiments, when the UE receives a NACK (or group NACK) with matching identifying information, such a matching MA signature index, then the UE assumes that the grant-free uplink transmission failed, but that activity detection was successful. In some embodiments, when the UE does not receive an ACK or a NACK, or when the UE receives mismatched ID info, then the UE assumes that both data detection and activity detection failed. However, in embodiments in which the base station 100 does not send NACKs, then the UE assumes that data detection failed, but the UE does not know whether activity detection was successful.

Additional Group ACK Embodiments

A group ACK is disclosed in some embodiments above. Additional group ACK embodiments are discussed below.

A group ACK may acknowledge more than one UE. The group ACK may have a fixed association with the time of UE uplink transmission. For example, all UEs that send a grant-free uplink transmission at time A may have their transmissions acknowledged in the group ACK. In other embodiments, the group ACK may acknowledge all UE packets received within a certain time window. For example, the base station may acknowledge all the UE packets that arrived since the previous group ACK was sent.

In some embodiments, the group ACK includes UE identify information (e.g. UE ID or MA signature) and/or packet identify information (e.g. packet ID or packet arrival time), for each uplink transmission being acknowledged. In some embodiments, the user identification and/or the packet identify information may be transmitted separately or aggregated and protected together. For example, as mentioned earlier, the group ACK may be a single payload protected by a CRC. The UEs know where to look for the group ACK. For example, there may be a dedicated channel for the group ACK, which is known to the UEs. The group ACK location may be preconfigured, semi-persistently configured, or dynamically changed using a control channel.

Figure 9:
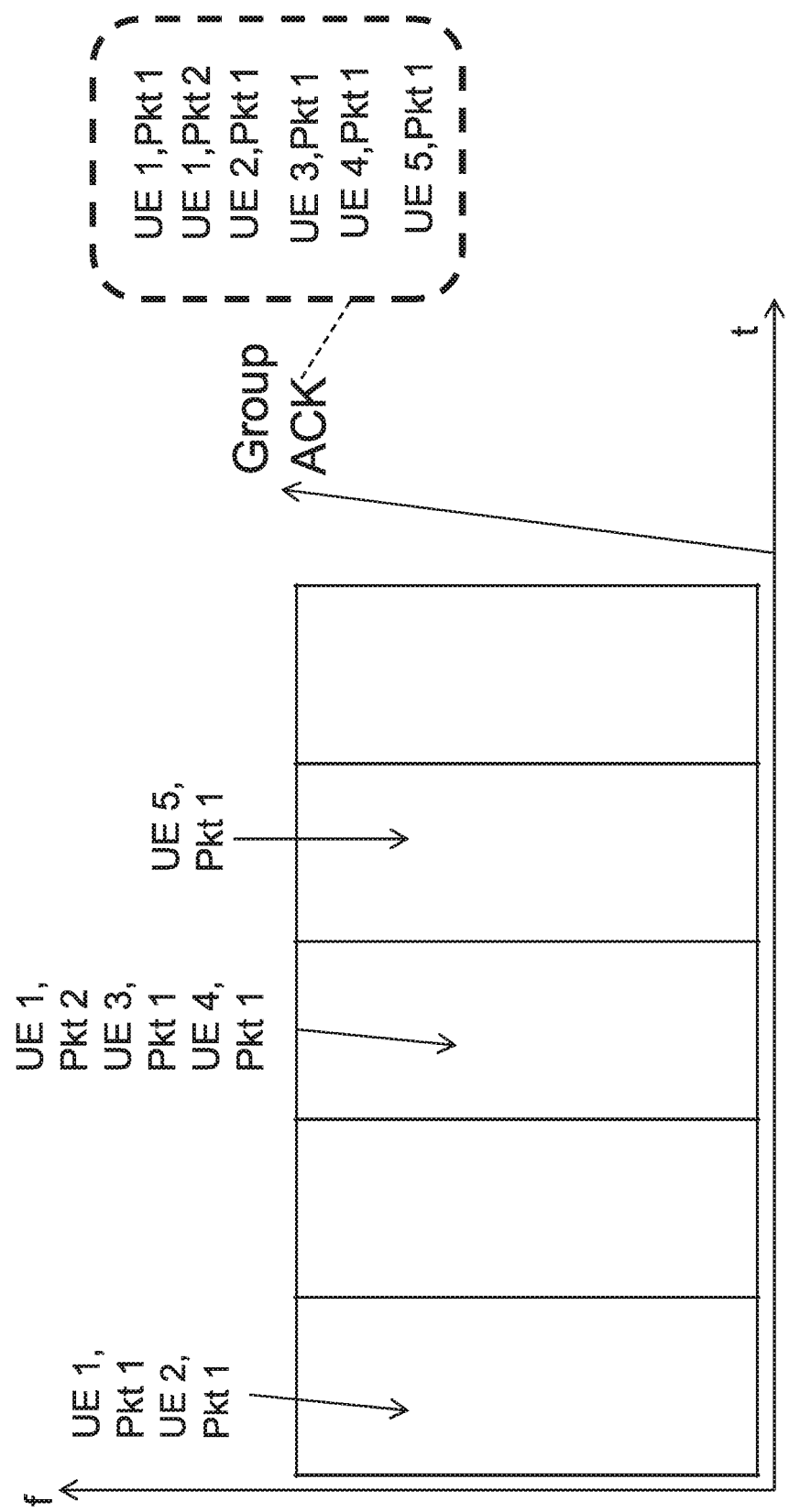
FIG. 9 is a time-frequency resource partition showing a group acknowledgement for packets sent during five previous time slots.

As one example, FIG. 9 illustrates a time-frequency partition separated into five time slots. In the first time slot, UE 1 sends a first packet and UE 2 also sends a first packet, both via a respective grant-free uplink transmission. In a third slot, UE 1 transmits a second packet, UE 3 transmits a first packet, and UE 4 transmits a first packet, each via a respective grant-free uplink transmission. In a fourth time slot, UE 5 transmits a first packet in a grant-free uplink transmission. Then, after the end of the fifth time slot, the base station sends a group ACK for the packets sent during the five time slots. In some embodiments, the grant-free resource allocation may comprise a predefined time-frequency partition. In other embodiments, the grant-free resources (and mapping to different UEs or UE groups) can be defined or predefined in a form of diversity patterns in terms of, e.g., time, frequency, code, and spatial domains, etc.

In some embodiments, the group ACK may also carry NACKs. In situations in which the group ACK is only carrying NACKs (e.g. no UEs had their data successfully decoded), then the group ACK may be called a group NACK.

In some embodiments, a group NACK may NACK all MA signatures that have been recently successfully detected and are being used by a group of UEs, but no UEs had their data successfully decoded. The group NACK messages may be listened to by all active UEs in the network such that the active UEs have knowledge of which MA signatures are currently being used by other UEs. As a result, each UE may choose a different MA signature from the NACK-ed MA signatures to try to avoid or minimize MA signature collisions. This is one of mechanisms that the base station may use to actively manage MA signature usage to avoid or minimize MA signature collisions.

In some embodiments, a NACK or group NACK signalling may be broadcasted to multiple UEs, possibly including UEs that are not transmitting grant-free signals at that time (e.g. possibly to UEs that are not waiting for an ACK/NACK for a grant-free transmission just sent). UEs may use the information learned from the NACK to try to avoid future collisions. As one example, if the NACK includes an MA signature index, then the other UEs may be able to determine which MA signature will be used for the retransmission, e.g.

based on a known mapping between MA signatures used for initial and retransmissions (e.g. as in table 302). The other UEs may then avoid choosing an MA signature that is the same as the MA signature that will be used for the retransmission. As another example, the UEs may be able to determine from the NACK which uplink resources will be used to send a retransmission, e.g. based on a known mapping relationship between initial and retransmission resources. The other UEs may then avoid transmitting on the same resources that will be used for the retransmission. As another example, if the NACK include a pilot index, and it is known by the UEs that the same pilot is to be used for both initial and retransmissions, then the other UEs may avoid using the pilot indicated by the pilot index in the NACK.

Finally, in all of the scenarios discussed earlier, e.g. whether the base station successfully decodes all, none, or some of the data for the grant free uplink transmissions, and/or whether the base station performs successful activity detection for all or some of the grant free uplink transmissions, the group ACK/NACK may be linked to the grant free resources used. That is, if a group of UEs use a particular time/frequency region or location A, then that group of UEs know where to look for the group ACK/NACK, e.g. the group ACK/NACK is at time-frequency location B in a downlink acknowledgement channel.

Redundancy Version and Retransmission Identification

As mentioned above, the base station 100 may perform HARQ combining on unsuccessfully decoded initial data and retransmission data to try to successfully decode the encoded packet of data being sent by the UE. One type of HARQ combining that may be used is soft combining, such as chase combining or incremental redundancy. Initial transmissions and retransmissions may use different RVs.

In order to decode the data, it may be necessary for the base station 100 to know the RV index of the data being received in a grant-free uplink transmission, unless there is only one predefined RV. In some embodiments, the grant-free uplink transmission may indicate the RV number and/or a new data indicator (NDI) flag indicating whether the grant-free uplink transmission is an initial transmission or a re-transmission. The potential downfall is that indicating the RV number and/or the NDI flag may use too many extra resources for signaling. In some embodiments, only chase combing is used, in which case, the RV index is the same for initial and retransmission and it is known by both the UE and the base station.

In some embodiments, the mapping between the initial transmission and retransmissions may be determined by a known mapping between MA signatures or physical resources, e.g. as in tables 302 to 306 of FIG. 4. As an example, if the mapping in table 302 is used, and if reference signal p21 is received by the base station 100, the base station 100 knows that the transmission must be a first retransmission associated with a previous initial transmission having reference signal p11. As another example, if the mapping in table 304 is used, and if a UE sends a grant-free uplink transmission using SCMA codebook C1, then the base station 100 knows that the transmission must be second retransmission associated with a previous first retransmission that used SCMA codebook B1, and also associated with a previous initial transmission that used SCMA codebook A1. As another example, if the mapping in table 306 is used, and if a UE sends a grant-free uplink transmission using resource B2, then the base station 100 knows that the transmission must be first retransmission associated with a previous initial grant-free uplink transmission that was sent on resource A2. In all of the examples in FIG. 4, the MA signature (in the case of tables 302 and 304) or the physical resource (in the case of table 306) also maps to a particular UE. However, in general this need not be the case.

In some embodiments, there may also or instead be a known mapping between the MA signature or physical grant free uplink resource used and the RV index. Depending upon the HARQ feedback from the base station 100 (e.g. ACK, NACK, or nothing), the UE selects an MA signature or uplink resource associated with a suitable RV number.

Figure 10:
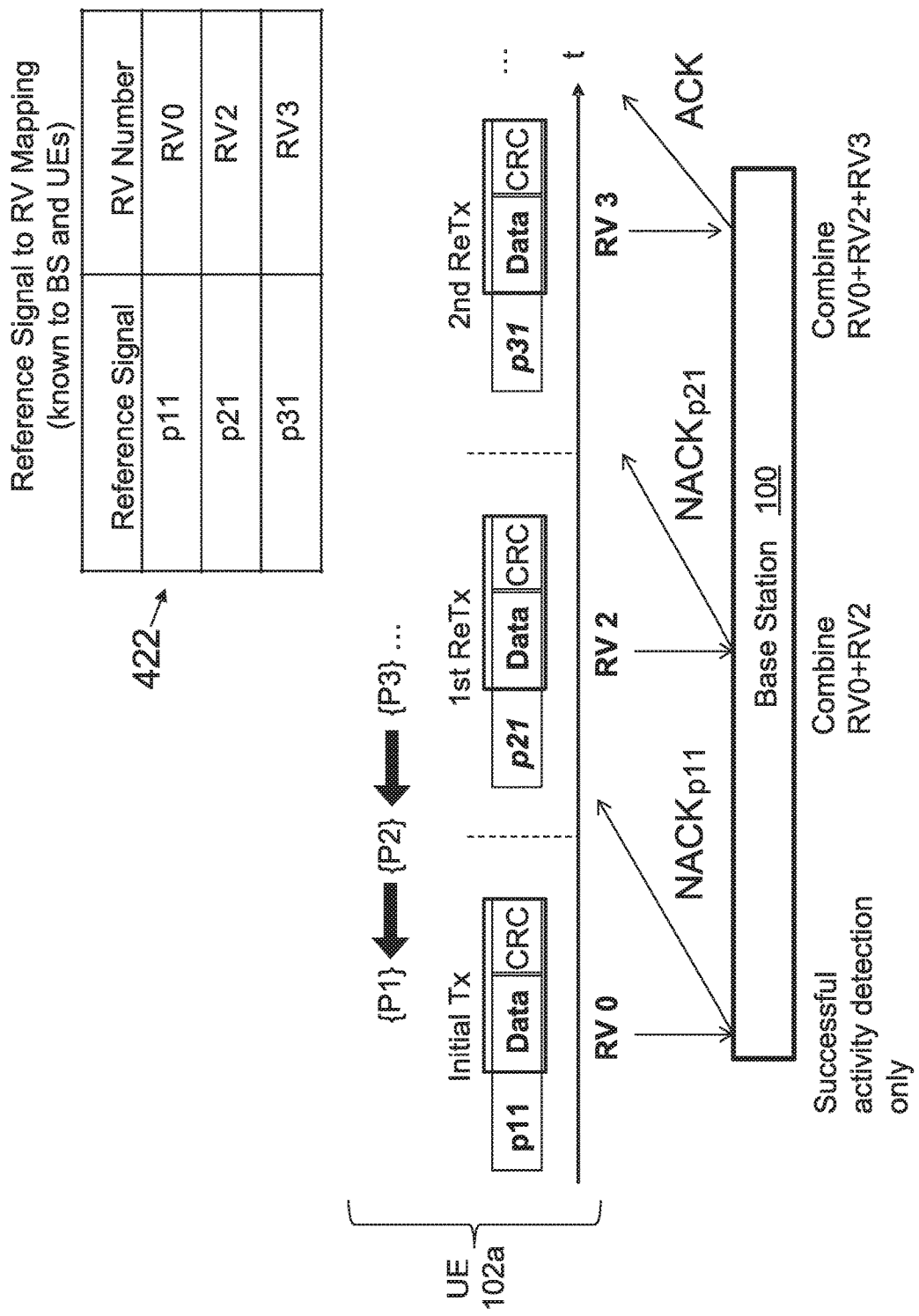
FIGS. 10 to 18 each illustrate an exchange in an example HARQ procedure between a UE and a base station.

FIG. 10 illustrates one example exchange in a HARQ procedure between UE 102a and base station 100. In the example of FIG. 10, there is ACK and NACK feedback, and activity detection is successful. The MA signatures are reference signals, and a mapping between reference signals and RV numbers is predetermined, and is shown in table 422. The UE 102a sends an initial transmission with reference signal p11. The base station 100 successfully decodes the reference signal p11 and therefore the base station 100 knows from the reference signal p11 that the data was sent using RV 0. However, the base station 100 is unable to successfully decode the encoded data. The base station 100 therefore stores the unsuccessfully decoded data in memory and sends a NACK. The NACK includes an index identifying reference signal p11. The UE 102a receives the NACK and determines that the NACK is for UE 102a due to the presence of the reference signal p11 index included with the NACK. Because the NACK is received by the UE 102a, the UE 102a knows that activity detection of the initial uplink transmission was successful, but the data in the initial uplink transmission was not successfully decoded. The UE 102a therefore sends a first retransmission using reference signal p21. The base station 100 successfully decodes reference signal p21 and therefore knows that the retransmission was sent using RV 2. The base station 100 then HARQ combines the RV 2 retransmission with the RV 0 initial transmission, but is still unable to successfully decode the data. The base station 100 therefore also stores the unsuccessfully decoded retransmission data in memory and sends a NACK. The NACK includes an index identifying reference signal p21. The UE 102a receives the NACK and determines that the NACK is for UE 102a due to the presence of the reference signal p21 index included with the NACK. Because the NACK is received by the UE 102a, the UE 102a knows that activity detection of the retransmission was successful, but the data was still not successfully decoded. The UE 102a therefore sends a second retransmission using reference signal p31. The base station 100 successfully decodes reference signal p31 and therefore knows that the retransmission was sent using RV 3. The base station 100 then HARQ combines the RV 3 retransmission with the RV 2 retransmission and the RV 0 initial transmission, and the base station 100 is able to successfully decode the data. The base station 100 therefore sends an ACK to the UE 102a. The ACK may include an index identifying reference signal p31, or the identity of UE 102a, so that UE 102a knows that the ACK is for UE 102a. In a variation of FIG. 10, different RVs may be transmitted for different retransmissions. For example, the first retransmission may use RV 1 instead of RV 2, and the second transmission may use RV 2 instead of RV 3. The specific RVs used in the figures are only an example.

Figure 11:
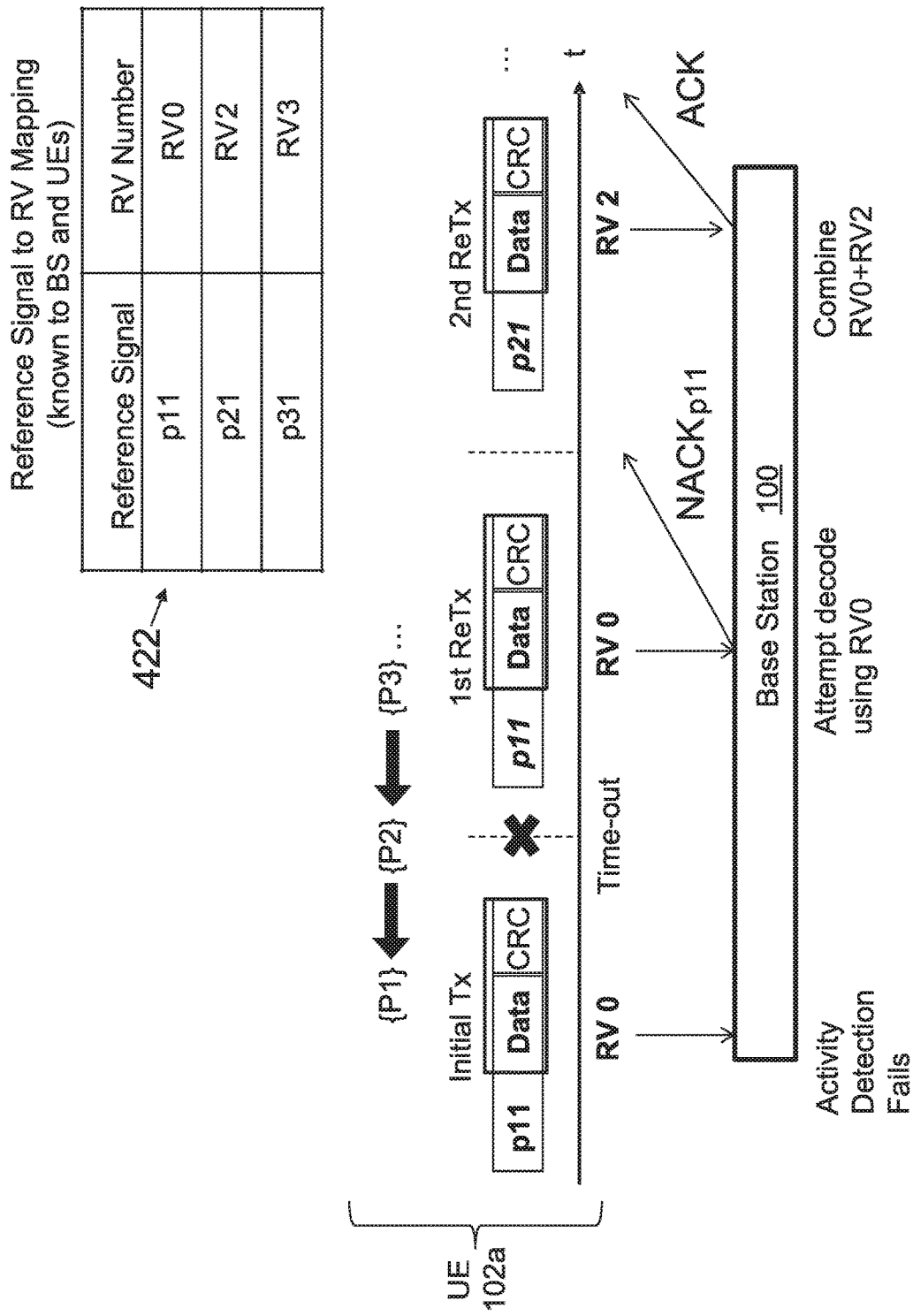

FIG. 11 is the same as the example exchange of FIG. 10, but with the following difference: the base station 100 does not successfully perform activity detection for the initial data transmission. The UE 102a makes a decision that the activity detection was not successful because neither an ACK nor a NACK is received within a time-out period. The UE 102a therefore sends the first retransmission using the same reference signal p11 (and therefore same RV number) as the initial transmission. The base station 100 successfully performs activity detection for the first retransmission, and so the second retransmission from the UE 102a includes reference signal p21 (and therefore is sent using RV 2). The base station 100 successfully decodes the data by combining the first retransmission and the second retransmission.

Figure 12:
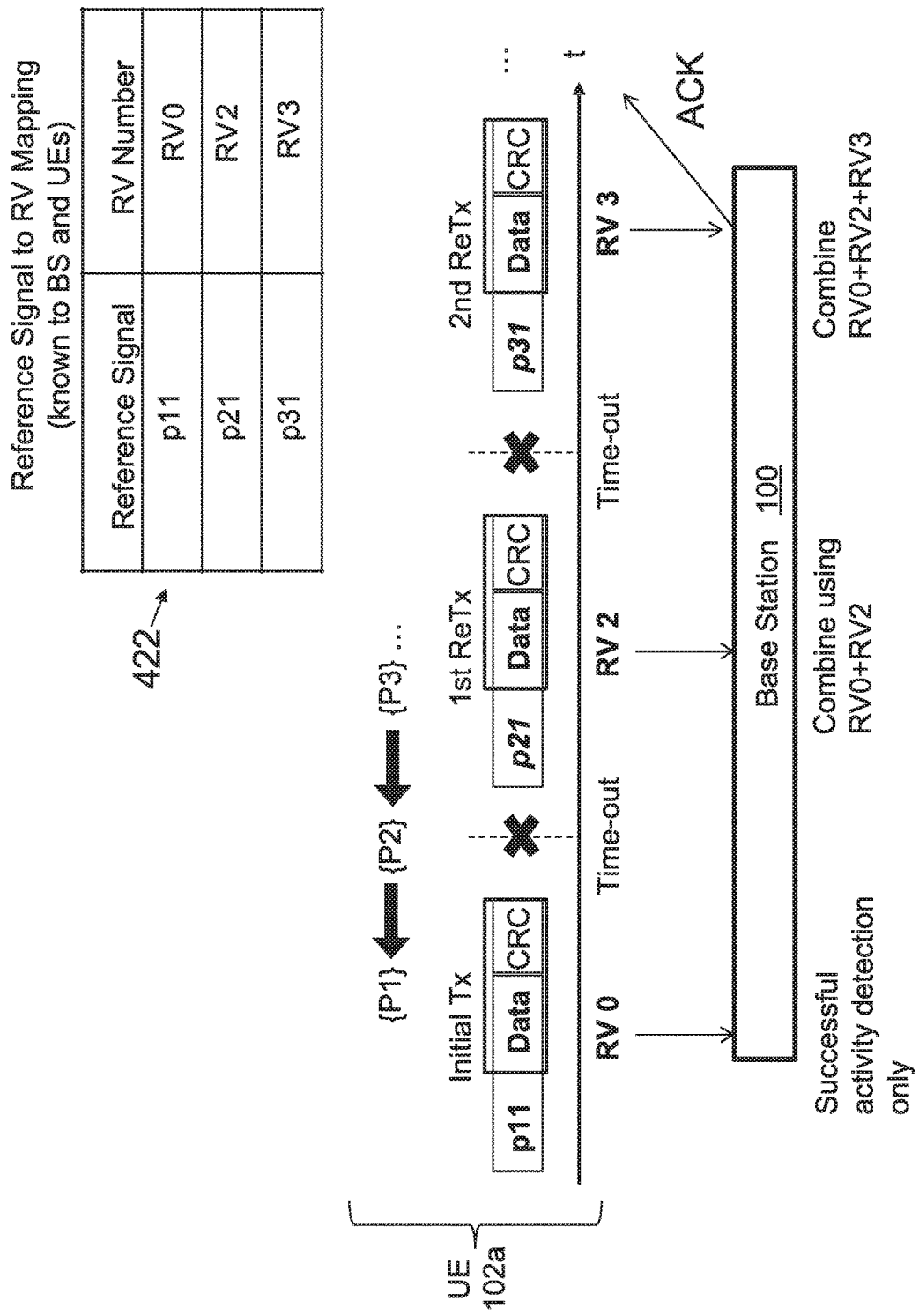

FIG. 12 is the same as the example exchange of FIG. 10, but with the following difference: NACKs are never sent by the base station 100. Only ACKs are sent. Therefore, although the base station 100 successfully performs activity detection of the initial transmission, the base station 100 does not successfully decode the data and therefore nothing is sent to the UE 102a. After a time-out period has expired, the UE 102a decides that the base station 100 did not successfully decode the data because no ACK was received. The UE 102a does not know whether activity detection was successful or not. The first retransmission uses reference signal p21 (and therefore RV 2). The UE 102a again waits for the expiry of a time-out period, and because an ACK is still not received, the UE 102a decides that the base station 100 still did not successfully decode the data. The UE 102a does not know whether the activity detection for the first retransmission was successful. The second retransmission uses reference signal p31 (and therefore RV 3). An ACK is then received from the base station 100, indicating that the base station 100 has successfully decoded the data.

Figure 13:
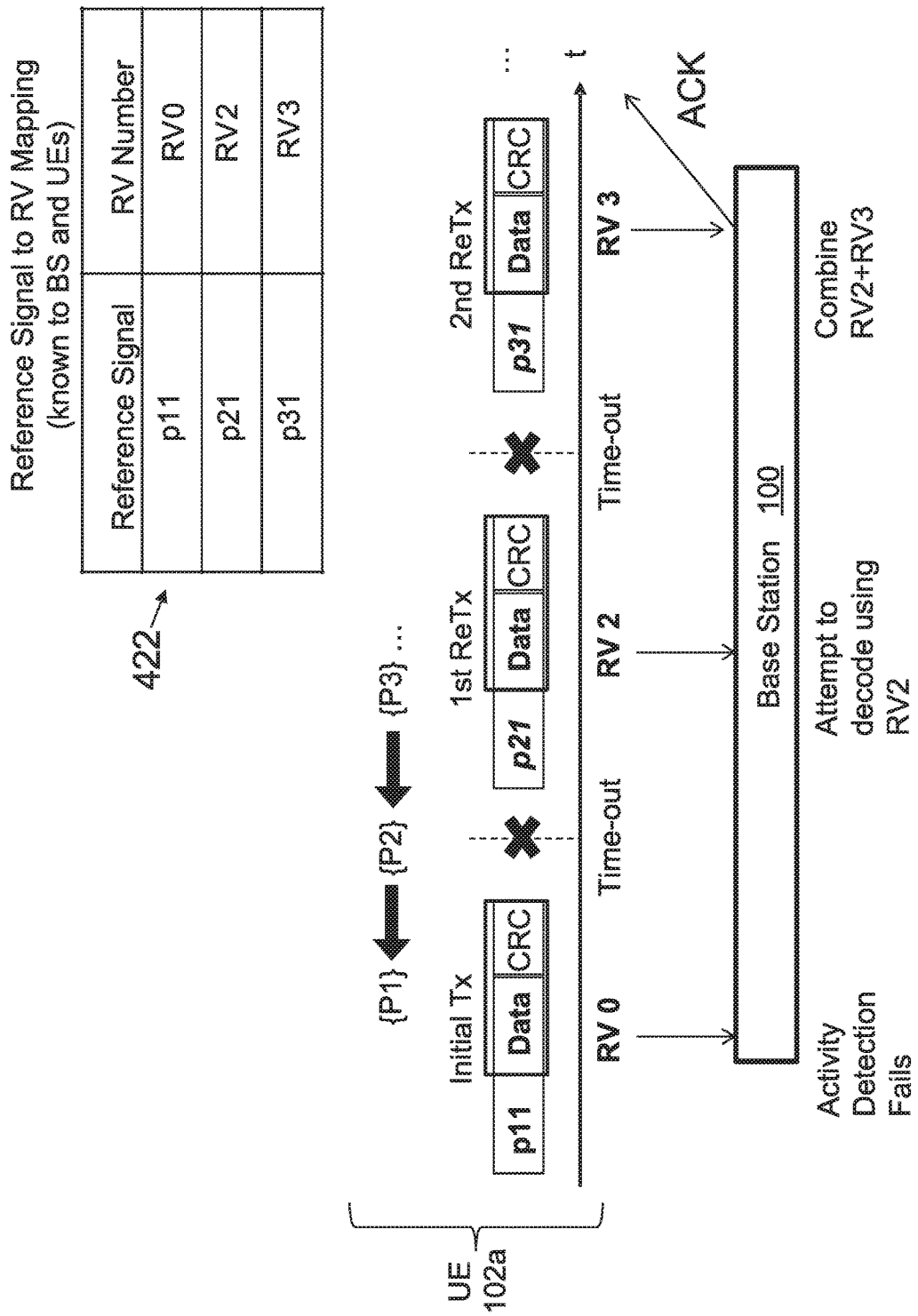

FIG. 13 is the same as the example exchange of FIG. 12, except in FIG. 13 activity detection fails for the initial transmission. The base station 100 therefore does not have the initial transmission with RV 0. Decoding of the data is performed using RV 2 and RV 3, which may not be as efficient as if the base station 100 had RV 0.

Figure 14:
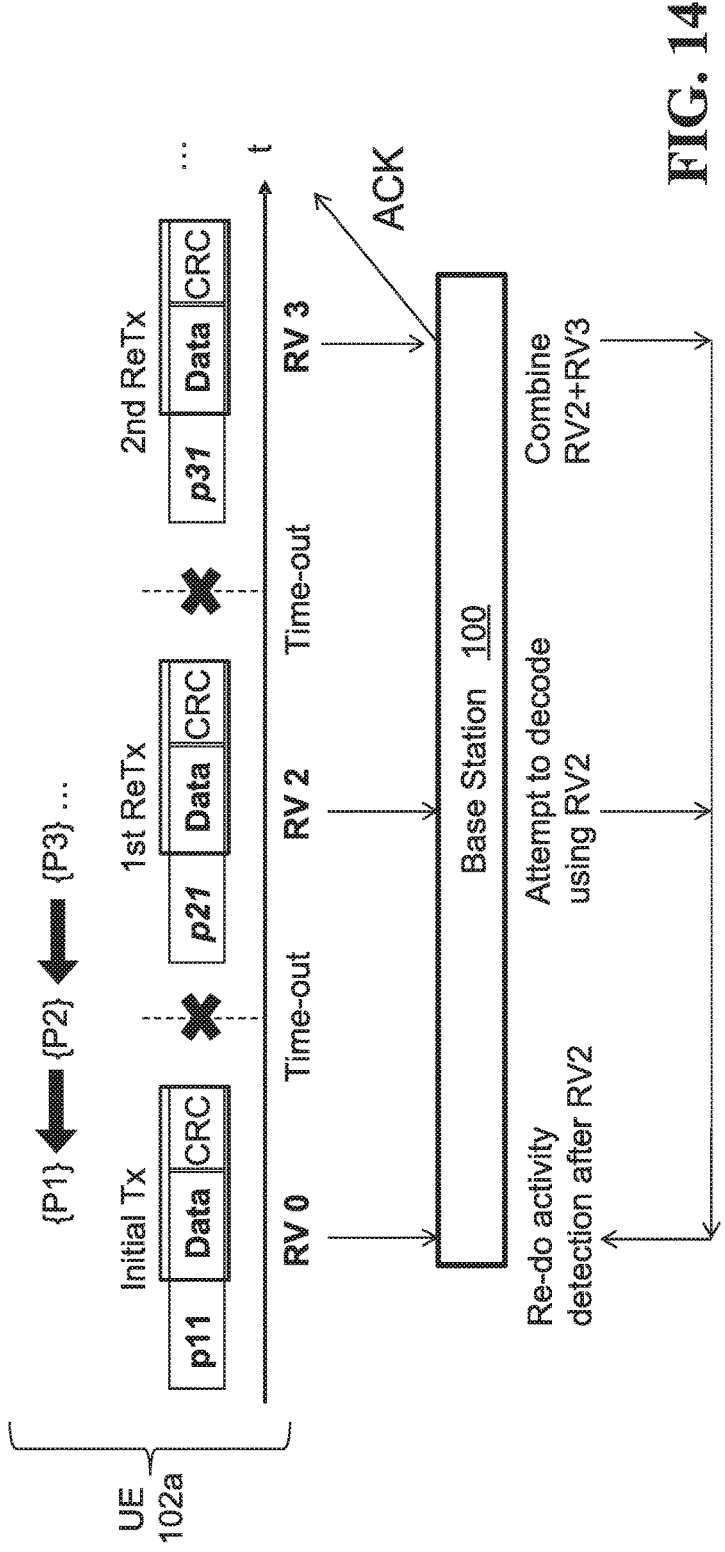

FIG. 14 is the same as the example exchange of FIG. 13, but with the following additional step: the base station 100 subsequently retries activity detection for the initial transmission. For example, a successful activity detection of a retransmission may reveal that an initial transmission, which was missed before, used reference signal p11. The base station 100 may use knowledge of p11 to help with subsequent activity detection of the initial transmission. Successful activity detection of the initial transmission may assist the base station 100 in performing activity detection and/or data detection for other UEs that transmitted at the same time-frequency location as the initial transmission from UE 102a.

In the example exchanges shown in FIGS. 10 to 14, the reference signal may also identify whether the transmission is an initial transmission, a first retransmission, or a second retransmission, e.g. using the mapping in table 302 of FIG. 4. However, more generally the reference signal does not need to uniquely identify whether the transmission is an initial transmission or a retransmission, or whether it is the first retransmission, a second retransmission, etc. Also, more generally, there does not need to be unique mapping between UEs and reference signals.

Figure 15:
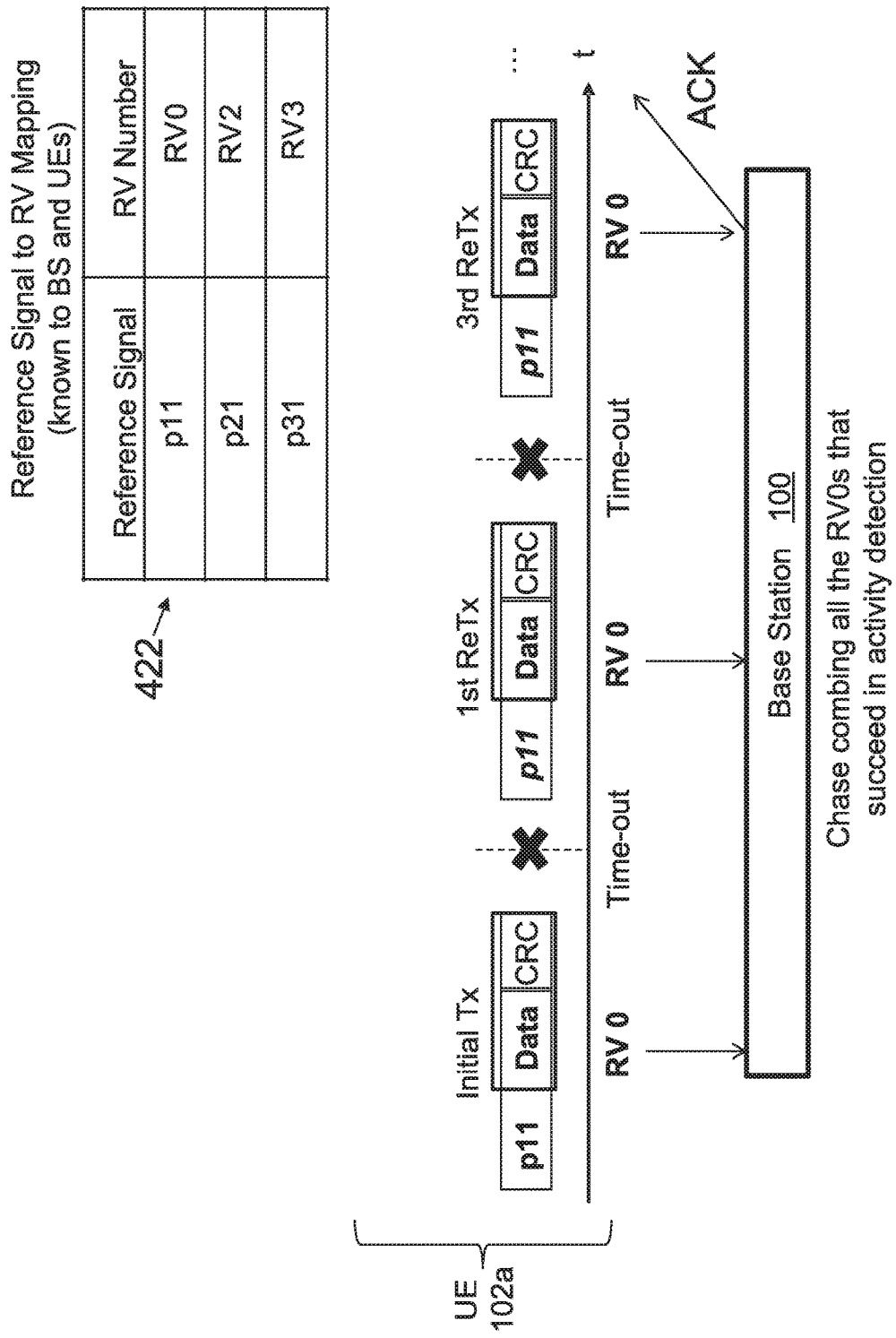

In the example exchanges shown in FIGS. 10 to 14, soft combining using incremental redundancy is performed by the base station 100. FIG. 15 illustrates an example exchange in which NACKs are never sent by the base station 100, and when no ACK is received the UE 102a always uses the same reference signal and associated RV 0. Chase combining is performed at the base station 100 using all received transmissions for which activity detection is successful. An ACK is sent to UE 102a once decoding of the data is successful. A possible benefit of FIG. 15, compared to the exchanges shown in FIGS. 12 to 14, is that in FIG. 15 the same reference signal is used for initial and retransmissions. There is no need to divide the reference signals into different sets {P1}, {P2}, {P3} for initial and retransmissions. Also, if activity detection of the initial transmission fails, the base station 100 will still be able to receive a retransmission having RV 0. There may or may not be a unique mapping between UEs and reference signals.

In a variation of the embodiment shown in FIG. 15, different reference signals may be used to identify initial and retransmissions (e.g. as in table 302 of FIG. 4), but all retransmissions may still use RV 0. The base station 100 still performs chase combining.

In the different example exchanges shown in FIGS. 10 to 15, the UE 102a may operate as follows. If a NACK is received with a matching MA signature (e.g. matching reference signal index), then the UE determines that activity detection was successful. The retransmission uses the next MA signature (e.g. next reference signal) associated with a next RV. An example is shown in FIG. 10. If the base station 100 is configured to transmit NACKs, and no NACK or ACK is received, then the UE determines that activity detection was unsuccessful. The UE may re-use the previous MA signature and RV for the retransmission, e.g. as in FIG. 11. If the base station 100 is not configured to send NACKs, i.e. ACK-only feedback, then the UE 102a does not know whether activity detection was successful in the absence of an ACK. The next MA signature and associated next RV may be used for the retransmission, e.g. as in FIGS. 12 and 13. The base station 100 may identify the RV using the MA signature. Even if the initial transmission is lost, the base station 100 may be able to identify the higher RV and decode using a higher RV, e.g. as in FIG. 13.

In FIGS. 10 to 15, the RV index can be identified based on the MA signature (e.g. as per table 422). However, in such embodiments, and more generally in any embodiments, the MA signature may not necessarily identify whether the transmission is an initial transmission or a retransmission. For example, other means may be used to identify whether the transmission is an initial transmission or a particular retransmission. For example, there may be a known association between an initial transmission physical resource and a retransmission physical resource (e.g. as in the example in table 306).

Figure 16:
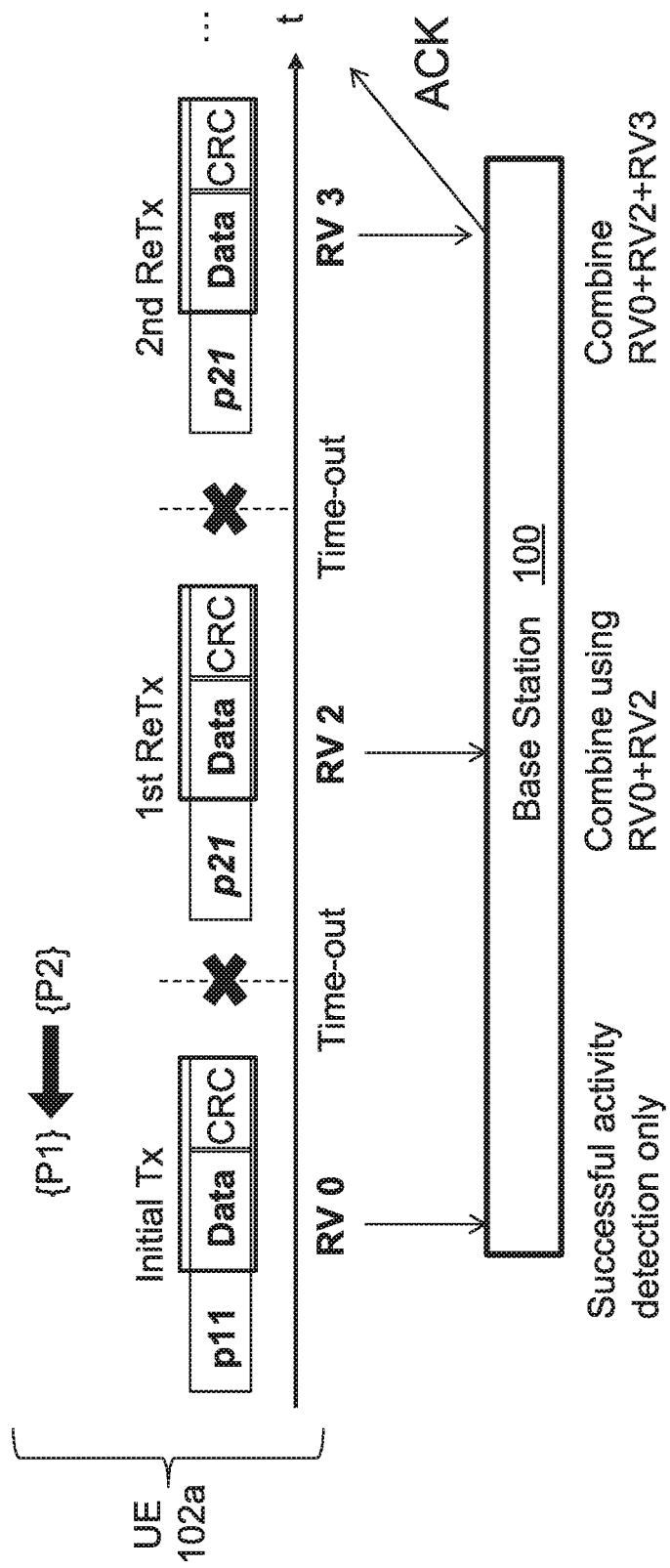

FIG. 16 illustrates a HARQ exchange in which separate reference signals are used for initial and retransmissions, but the reference signal used for retransmissions is the same regardless of whether it is a first retransmission, a second retransmission, etc. The reference signals therefore are only partitioned into two pools: initial transmission reference signals {P1} and retransmission reference signals {P2}. If more than two RVs are used for incremental redundancy (which is the case in FIG. 16), then the RV number may be identified by the base station 100 based on the transmission attempt number. The transmission attempt number may be determined through: a fixed resource mapping (e.g. first retransmission on resource A, second retransmission on resource B, etc); or inherently based on an ACK/NACK that may be received (e.g. when a NACK is received, then rotate the RV to the next RV from the fixed pattern, and if no is NACK sent, it means activity detection failed and the UE uses the same RV); or by counting the number of transmissions. In some embodiments, no NACKs are sent by the base station 100 (as illustrated in FIG. 16). In other embodiments, a NACK may be sent when the packet data is not successfully decoded.

Reference Signal Assignment for mMTC and URLLC

In some embodiments described above, the MA signature may be or include a reference signal. The reference signal can be a demodulation reference signal. In some applications, such as mMTC, the number of UEs that perform grant-free uplink communication may exceed the number of available reference signals. In such applications, the reference signals may include non-orthogonal reference signals in addition to orthogonal reference signals to increase the pool of available reference signals. Multiple UEs may be mapped to each reference signal. Additionally or instead, each UE may randomly select a reference signal from the pool when sending a grant-free uplink transmission.

In other applications, such as URLLC, the number of UEs that perform grant-free uplink communication may be less than the number of available reference signals. The reference signals may or may not include non-orthogonal reference signals in addition to orthogonal reference signals. As discussed above, in some embodiments there may be a unique mapping between reference signals and UEs for a given grant-free uplink resource partition. In some embodiments, the configuration of any unique mapping between reference signals and UEs may change over time. For example, the mapping of UEs 102a-c to tuple indices in table 302 may change over time according to a known and fixed hopping pattern. The unique mapping of UEs 102a-c to tuple indices may avoid collision and assist in signaling in the manner discussed above.

HARQ Timing and Signaling

When data is initially sent from a UE using a grant-free uplink transmission, and a retransmission of the data is to be performed, then different retransmission timing and signaling scenarios are possible. In some embodiments, the time of retransmission is decided by the UE. When the UE decides to retransmit the data, the retransmission is sent on a grant-free uplink resource in a grant-free region. The signaling indicating that the transmission is a retransmission may be explicitly or implicitly included in the retransmission itself (e.g. based on the reference signal used), as described above. That is, there may not be signaling separate from that in the retransmission message itself. In some embodiments, the UE may wait a backoff duration before sending a retransmission. The backoff duration may be randomly selected, or it may be selected based on a predefined pseudo random pattern, e.g. based on the UE ID. In some embodiments, the retransmission timing may be synchronous, i.e. the timing and/or frequency location between initial transmissions and retransmissions may be fixed and known to both the base station and the UEs. If the retransmission timing is synchronous, then the UE may send the retransmission using the dedicated retransmission resources.

In some embodiments, retransmissions may be scheduled by the base station. For example, if the base station determines that there are too many collisions in the grant free region, the base station may schedule some or all of the retransmissions on grant-based resources instead. The base station may need to have knowledge of which UEs are sending the grant free transmissions, e.g. through successful activity detection. In some embodiments, the base station may schedule the retransmissions in a contention-free region or a contention-based region. In some embodiments, the resources on which the retransmission is scheduled may be indicated in a downlink channel. In some embodiments, the retransmission scheduling grant may be coupled to the NACK message. In some embodiments, the base station may indicate a timing difference between the initial transmission and the retransmission, and then the UE sends the retransmission using the same frequency resources as the initial transmission, but at the later time indicated by the timing difference. Indicating only a timing difference may use less overhead. In some embodiments, the base station may indicate to a UE an index of a retransmission hopping pattern from a predefined pool of patterns. The index may be indicated using a small number of bits. Based on the index, the UE then uses the corresponding retransmission hopping pattern to send any retransmissions.

Retransmission Identification with Fixed Resource Mapping

In some of the embodiments described above, initial and retransmissions can be distinguished based on the MA signature or physical resource used by UE, e.g. as in the mappings shown in the tables in FIG. 4. In some embodiments, there may also or instead be a fixed resource/hopping pattern for transmissions of the same UE. The base station 100 may then identify the mapping between transmissions through association of the resource hopping pattern. For example, if the base station receives a transmission at time-frequency location B, the base station may know from a fixed hopping pattern that the transmission is a retransmission of data corresponding to a previous transmission that was sent at time-frequency location A. In such embodiments, a mapping between MA signatures and transmission attempts (e.g. as in table 302 of FIG. 4) may still be used to identify which packets are initial and retransmissions, because there may be multiple packets transmitted by the same UE. Also, when multiple UEs use the same uplink resources, the reference signal may be used to estimate the different UE's channels.

ACK/NACK-Less ("A/N-Less") Retransmission

In some embodiments, the UE does not wait for ACK and/or NACK feedback (or expiry of a timer) before sending retransmissions. For example, when a UE has a grant-free uplink transmission to send, the UE may send the initial transmission, and then immediately (or shortly) thereafter send a first retransmission followed by a second retransmission. In some embodiments, the initial and retransmission resources may be pre-allocated in a diversity pattern of time, frequency, and/or spatial domains. In some embodiments, the retransmissions may be stopped earlier, e.g. if the base station correctly decodes the initial data and an ACK is received from the base station, or based on other criteria, such as the lifespan of the packet exceeding the latency bound. In A/N-less transmission, the MA signatures may still be used to identify initial/retransmission and/or RV number.

In some embodiments, a method performed by a UE includes transmitting an initial grant-free uplink transmission of encoded data. Then, without receiving a NACK for the encoded data addressed to the UE, the UE transmits at least one grant-free uplink retransmission of the encoded data. There may also be no waiting for an expiry of a timer before sending the retransmission. That is, the UE does not even wait to see if it will receive a NACK (e.g. in NACK-less embodiments). In some embodiments, the UE transmits k grant-free uplink retransmissions of the encoded data, where k≥1. The value k may be preconfigured in advance. In some embodiments, the initial grant-free uplink transmission utilizes at least one of an MA signature and an uplink resource that identifies the initial grant-free uplink transmission as the initial transmission of the encoded data.

Other Example HARQ Exchanges

Figure 17:
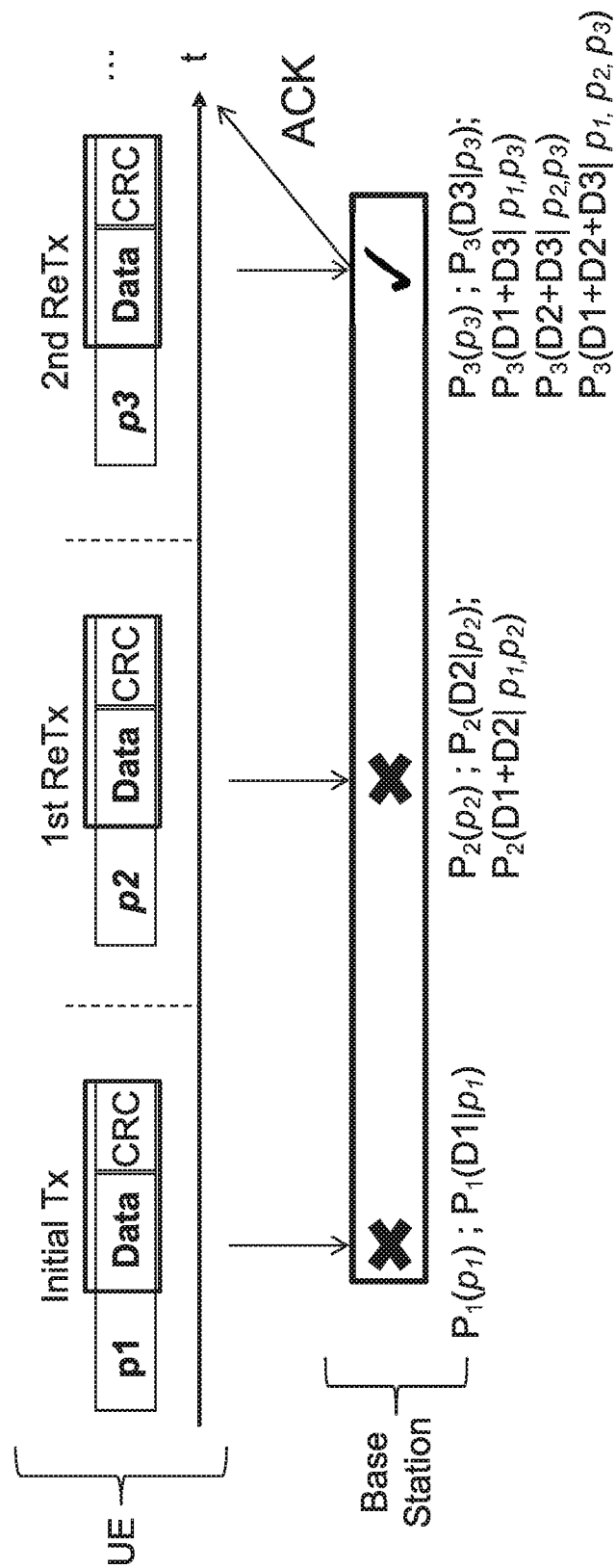

FIG. 17 illustrates an example HARQ exchange in which different pilots p1, p2, and p3 are respectively used for the initial transmission, first retransmission, and second retransmission. Each pilot includes either a DMRS, RACH preamble, or combined function of RACH preamble and DMRS.

$P_1$ (p1) is the successful detection probability of the UE activity for the initial transmission. $P_1$ (D1|p1) is the successful detection probability of the data for the initial transmission given successful activity detection, i.e. given reference signal p1 was used for the initial transmission. $P_2$ (p2) is the successful detection probability of the UE activity for the first retransmission. $P_2$ (D2|p2) is the successful detection probability of the data for the first retransmission given successful activity detection, i.e. given reference signal p2 was used for the first retransmission. $P_2((D1+D2)|(p1, p2))$ is the successful detection probability of the HARQ combined signal from the initial transmission and first retransmission of the UE, given the successful activity detection (p1, p2) for the two receptions. $P_3$ (p3) is the successful detection probability of the UE activity for the second retransmission. $P_3$ (D3|p3) is the successful detection probability of the data for the second retransmission given successful activity detection, i.e. given reference signal p3 was used for the second retransmission. $P_3$ ((D1+D3)|(p1, p3)) is the successful detection probability of the HARQ combined signal from the initial transmission and second retransmission of the UE, given the successful activity detection (p1, p3) for the two receptions. $P_3$ ((D2+D3)|(p2, p3)) is the successful detection probability of the HARQ combined signal from the first retransmission and second retransmission of the UE, given the successful activity detection (p2, p3) for the two receptions. $P_3$ ((D1+D2+D3)|(p1, p2, p3)) is the successful detection probability of the HARQ combined signal from the initial transmission, the first retransmission, and the second retransmission of the UE, given the successful activity detection (p1, p2, and p3) for the three receptions.

The retransmission strategy depends upon the implementation. In one embodiment, a retransmission is performed by the UE if a NACK is received, or if nothing is received within a time-out period.

In A/N-less embodiments, there may be a fixed number of retransmissions per packet. For example, as shown in FIG. 17, there may be two retransmissions per packet. In some embodiments, the base station may not provide any HARQ feedback during the fixed number of transmissions. For example, during the initial transmission and two retransmissions shown in FIG. 17, the base station may not provide HARQ feedback. The HARQ feedback may be provided at the end of the second retransmission. For example, if at the end of the second retransmission the base station has successfully decoded the packet, then an ACK may be sent. Otherwise, a NACK or nothing is sent. In some embodiments, the HARQ feedback may include an explicit scheduling grant to schedule a retransmission of the packet. In some embodiments, during the fixed number of transmissions, if HARQ feedback is received from the base station, then the fixed number of transmissions may be stopped early. For example, the UE may be configured to send an initial transmission, followed by the first and second retransmissions immediately thereafter. However, if the base station successfully decodes the initial transmission and sends an ACK that is received by the UE before the UE sends the second retransmission, then the UE may not send the second retransmission.

In a variation of FIG. 17, pilot p1=p2=p3. That is, the same pilot is used by the UE for both the initial transmission and the first and second retransmissions. The remaining discussion above made in relation to FIG. 17 still applies.

In another variation of FIG. 17, p1≠p2, p1≠p3, but p2=p3=p. That is, an initial transmission pilot p1 is used for the initial transmission, and another pilot p=p2=p3 is used for both the first retransmission and the second retransmission. The remaining discussion above made in relation to FIG. 17 still applies.

In some embodiments, the number of consecutive transmissions with A/N-less mode may be based on a UE channel condition. For example, if the UE is close to cell center, one retransmission may be configured or pre-defined by the base station. Whereas, if the UE is at the cell edge, three or more consecutive transmissions may be configured or pre-defined by the base station. In another embodiment, a UE may select the number of A/N-less continuous transmissions by itself, e.g. based on the channel conditions, such as based on the downlink pilot measurements. Selecting the number of A/N-less transmissions may be done by choosing one of a pilot pool, or one multiple-tuple from a pilot tuple set that has been pre-defined by the base station to map to different transmissions times, e.g., {pilot pool 1: p1, p2, p3, p4, p5} mapping to continuous transmission times of 2, and {pilot pool 2: p6, p'7, p8, p9, p10} mapping to continuous transmission times of 4.

Figure 18:
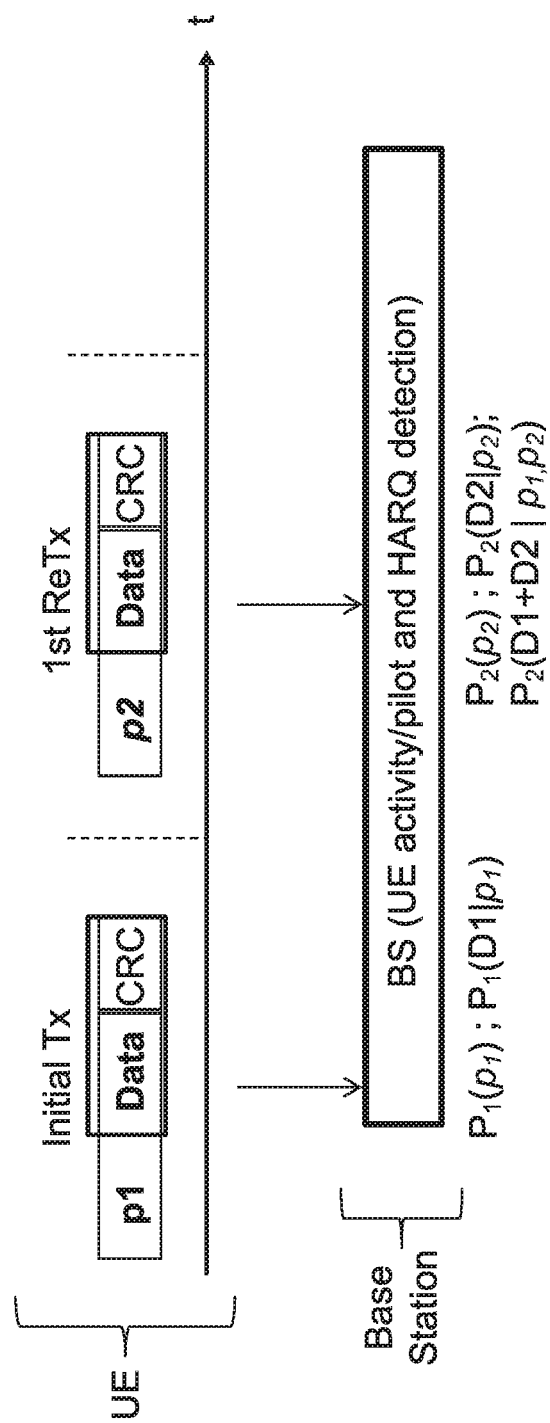

FIG. 18 is a variation of FIG. 17 in which there is only one retransmission. The exchange in FIG. 18 is A/N-less. Each pilot p1 and p2 includes either a DMRS, RACH preamble, or combined function of RACH preamble and DMRS. There is a predefined fixed number of retransmissions per packet. In the example in FIG. 18, there is specifically one retransmission. That is, the UE sends an initial transmission, and then follows up by sending one retransmission without waiting for an ACK/NACK (or expiry of a time-out period). In FIG. 18, the base station is configured to send no HARQ feedback until the end of the first retransmission. If the base station is able to successfully decode the data using the initial transmission and/or first retransmission, then the base station sends an ACK to the UE. Otherwise, either a NACK or nothing is sent to the UE.

Different MA Signatures to Identify Different Packets

In some embodiments, when sending grant-free uplink transmissions, the same UE may use different MA signatures (e.g. different reference signals) to identify different packets from the UE. This may be useful if, for example, a UE needs or wants to send a new packet before a previous packet is acknowledged by the base station.

Figure 19:
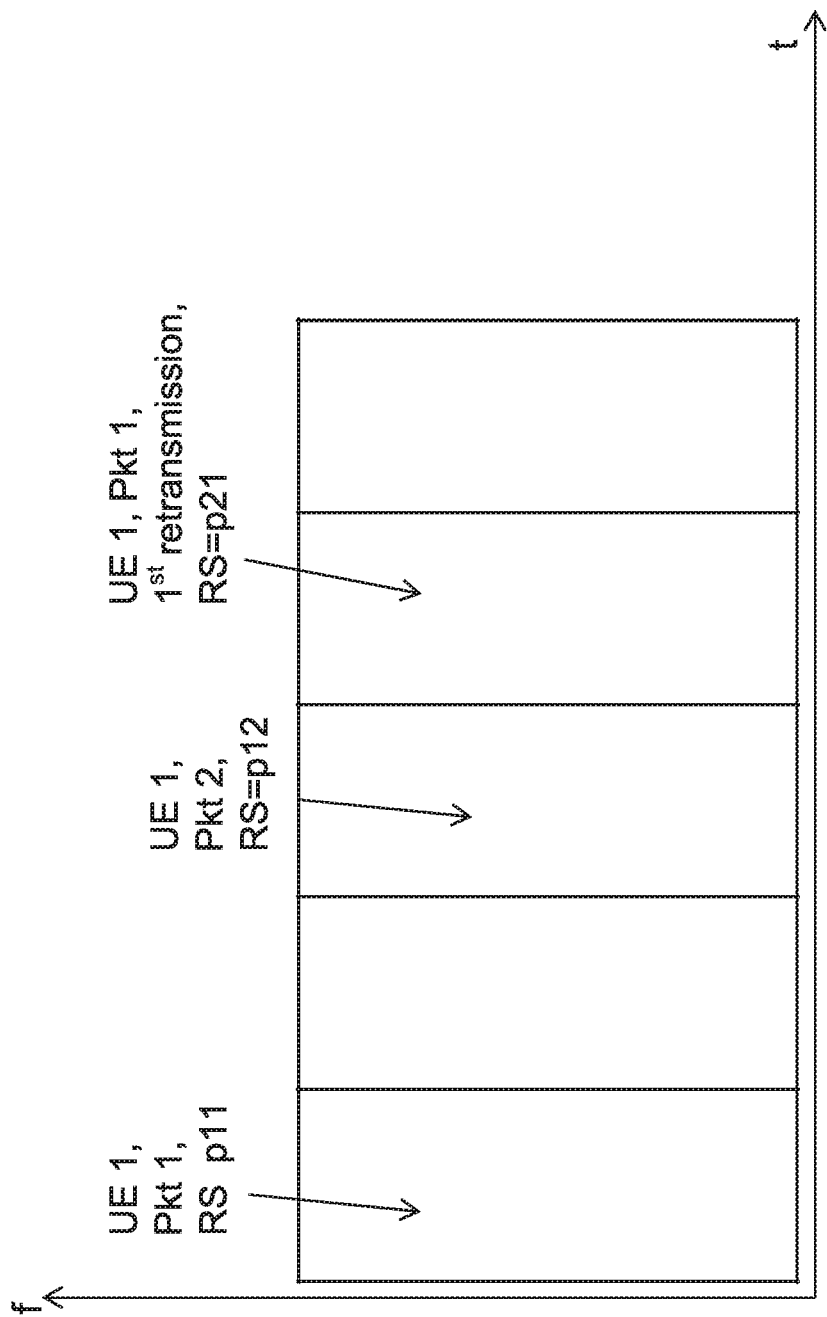
FIG. 19 is a time-frequency resource partition showing different packets having different reference signals.

As one example, FIG. 19 illustrates a time-frequency partition separated into five time slots. In the first time slot, UE 1 sends a first packet using reference signal p11. In a third time slot, UE 1 sends a second packet using reference signal p12. In a fourth time slot, UE 1 sends a first retransmission of the first packet using reference signal p21. The pilots may identify initial transmissions and related retransmissions, e.g. using the mapping in table 302 of FIG. 4.

Adjusting Retransmission Parameters

In some embodiments, the retransmission parameters of the UE retransmissions (e.g. the power and/or MCS and/or bandwidth and/or resources of a retransmission) may be adjusted, either through explicit signaling from the base station (e.g. in a NACK or as part of a scheduling grant) or at the UE's own initiative. Alternatively, the parameter adjustment may be predefined or preconfigured in advance.

For example, when sending a retransmission, the UE may increase its power and/or lower the MCS of the retransmission to try to improve the reliability of the retransmission. The bandwidth and/or the amount of resources used for the retransmission may also or instead be modified to try to improve the reliability of the retransmission.

As in some embodiments above, a different RV may be used for the retransmission. The RV to use for the retransmission may, in some embodiments, be specifically signaled by the base station either through DCI, or coupled with the NACK for retransmissions.

Longer Cylic Prefix (CP) for Reference Signal

If the arrival timing differences between the uplink transmissions of different UEs are within a CP length, then there is no intra-cell interference. However, in cases in which the UE does not receive an accurate uplink timing adjustment (TA) before the uplink data transmission, then the synchronizations between different UE's signals may not be perfect, and this may lead to intra-cell interference and performance degradation.

In view of the paragraph above, in some embodiments the reference signal in a grant-free uplink transmission may use a longer CP (e.g. a "long CP") in order to try to have a better synchronization for the reference signal. This may improve UE detection and channel estimation performance.

The OFDM data symbols may use the same longer CP length to try to improve performance, or a shorter CP to reduce CP overhead.

As one example, the pilot OFDM symbol(s) may use a longer CP (e.g. the "long CP"), and the data OFDM symbol(s) may use a shorter CP (e.g. the "short CP").

UE Sensing

In some embodiments, before sending a grant-free uplink transmission, the UE may sense to determine if there is a transmission of another UE presently ongoing, and if so, the UE may back off or send the grant-free uplink transmission using other resources.

For example, there may two groups of UE: delay sensitive UEs sending grant-free uplink transmissions (e.g. URLLC UEs), and UEs that are more delay tolerant and are sending scheduled uplink transmissions (e.g. eMBB UEs). Some resources may be shared by both groups of UEs. A UE wanting to send a grant-free transmission (e.g. a URLLC UE) may first sense for a special design short signal (e.g. that is sent by an eMBB UE) before a transmission time interval (TTI). If there is no special design short signal being transmitted, then the grant-free transmission is sent during the TTI. As another example, the UE wanting to send a grant-free transmission may sense for normal signals (e.g. that are sent by an eMBB UE) in the first symbol of the TTI. If there are no normal signals being transmitted, then the grant-free transmission is sent beginning at the second symbol in the TTI.

The opposite may also occur. The delay tolerant UE (e.g. eMBB UE) may sense for a grant-free transmission special design short signal before a TTI. If a special design short signal is sensed, and the delay tolerant UE is grant-based, it may be able to stop its transmission in the TTI. The base station may perform a blind detection of delay sensitive (e.g. URLLC) pilots to determine whether the uplink transmission is the scheduled transmission from the delay tolerant UE or instead a grant-free uplink transmission. If the base station determines that a grant-free uplink transmission was sent instead, then the base station may reschedule the interrupted delay-tolerant uplink transmission at a future time (e.g. in a later TTI).

In some embodiments, a UE may be able to sense which MA signatures are used by other UEs in a way similar to activity detection performed by the base station. Once the UE senses certain MA signatures are used by other UEs, the UE may choose to use other MA signatures to avoid potential collision of MA signatures with the UEs using these MA signatures.

Random Access Procedure Using Grant-Free Uplink Transmission

In some embodiments, a random access procedure may be performed using grant-free uplink transmission. By using grant-free uplink transmission, steps may be saved. An example is described below that may be called "two-step random access procedure" (or "two-step RACH").

In a first step, the UE sends a grant-free uplink transmission having a preamble, e.g. an LTE RACH-like preamble signal, in the physical random access channel (PRACH) resource area(s) together with the data signal (e.g., in a different resource area). In some embodiments, the data signal is not transmitted together with the preamble in the first step. The preamble sequence may be used for functions used for RACH, such as initial access, UE identification and timing advance (TA) estimation. In some embodiments, the preamble sequence may also be used as a reference signal (RS) with functions of UE detection and channel estimation (e.g. the preamble sequence may be the MA signature described earlier that allows the base station to perform activity detection, channel estimation, and also UE identification). In some embodiments, the grant-free uplink transmission may also contain a buffer status report (BSR) to notify the base station how much data it has in the UE buffer.

In a second step, a random access response (RAR) is sent by the base station to the UE. The RAR may include an ACK/NACK of the grant-free uplink transmission, which may carry information such as the UE ID or an identification of the MA signature used in the grant-free uplink transmission. The RAR may also include a scheduling grant (SG) to schedule the UE to transmit more data or retransmit data. The SG may contain typical scheduling information, such as resources to use, the MCS, and the RV index. The message sent from the base station may also provide TA information.

Scheduling Request Based Contention

In LTE, a scheduling request (SR) is dedicated to each UE in, e.g., connected state, and each TTI just serves a few UEs for uplink SR signaling with orthogonal resources (e.g., physical uplink control channel (PUCCH)). Therefore, each UE taking a turn for a SR opportunity has a relatively long period of time to wait for a large number of UEs in a serving area or cell. In some latency constrained applications, such as URLLC services, the transmission latency for some users may be violated.

In view of the paragraph above, in one embodiment a larger amount of SR resources are used, especially for low latency applications, because of the need for more frequent SR opportunities. Instead, or additionally, more than two UEs may share a SR resource, i.e., use grant-free/contention based SR signaling, so as to try to shorten the SR request and uplink grant time. As one example, more UEs may share the PUCCH in a contention-based manner (using grant-free uplink transmissions) for possibly more immediate SR transmission for each UE.

ACK/NACK Reliability

Due to the high reliability requirement of some applications, such as URLLC, the ACK/NACK may need to be sent with higher reliability, e.g. by means of CRC protection, lower MCS, repetition, etc. In some embodiments, the probability of an error occurring in which a NACK is mistaken by the UE as an ACK should be kept very low, e.g., using a low code rate to try to ensure that the NACK is correctly decoded by the UE.

Some Example Methods and General System

Figure 20:
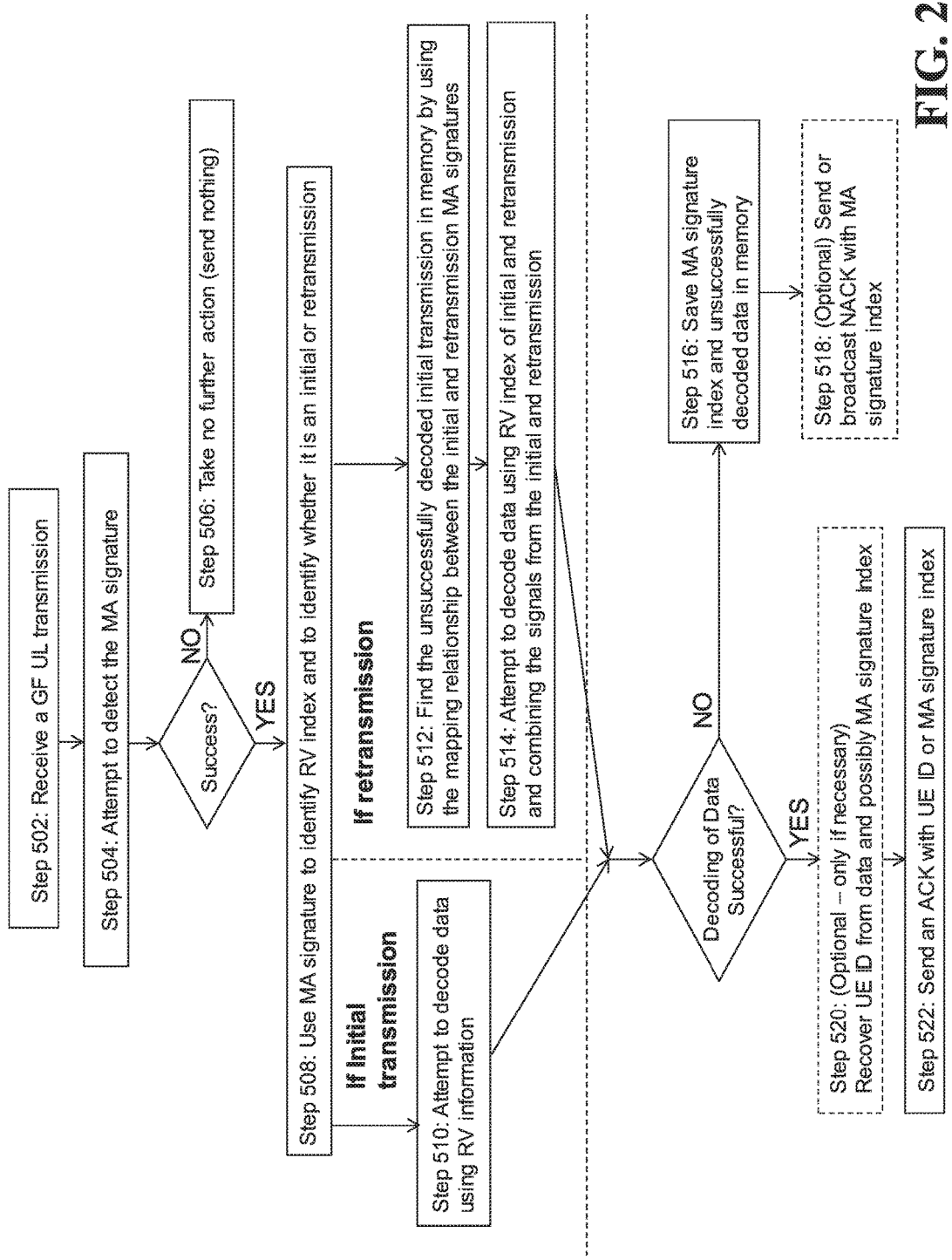
FIG. 20 is a flowchart of a method performed by a base station, according to one embodiment.

FIG. 20 is a flowchart of a method performed by a base station, according to one embodiment. In step 502, the base station receives a grant-free uplink transmission. In step 504, the base station attempts to detect the MA signature in the grant-free uplink transmission. If the base station cannot successfully detect the MA signature, then in step 506 no further action is taken. If the base station is able to successfully detect the MA signature, then in step 508 the MA signature is used to identify the RV, e.g. through a mapping between the MA signature and RV index. The MA signature is also used to identify whether the transmission is an initial transmission or a retransmission, e.g. through a mapping between the MA signature and initial and retransmissions. If the transmission is an initial transmission, then in step 510 the base station attempts to decode the data in the grant-free uplink transmission using the RV information. On the other hand, if the transmission is a retransmission, then instead in step 512 the base station finds the unsuccessfully decoded initial transmission in memory by using the mapping relationship between the initial and retransmission MA signatures, e.g. the MA signature is used to identify in memory a corresponding MA signature associated with the initial transmission, and then the unsuccessfully decoded initial data is retrieved from memory. The base station may use other methods to identify or to help to identify the initial unsuccessfully decoded data. For example, there may be a known association of physical resources used by initial and retransmissions. Then the base station may find the corresponding signals of initial data and retransmission data through this physical resource association. In step 514, the base station then attempts to decode the data by using the RV of the initial transmission and the RV of the retransmission, and by combining the signals from the initial and retransmission.

If decoding of the data is successful, then optionally in step 520 the base station recovers the UE identity from the data and possibly also from the MA signature index (e.g. if the combination of the MA signature and a UE index is needed to uniquely identify the UE). In step 522 an ACK is sent to the UE. The ACK includes the identity of the UE or the index identifying the MA signature of the uplink transmission.

If decoding of the data is not successful, then in step 516 the MA signature index and the unsuccessfully decoded data is stored in memory so that it may be accessed when a subsequent retransmission is received, and so that the unsuccessfully decoded data may then be combined with the subsequent retransmission. Optionally, in step 518, the base station broadcasts or sends a NACK, which may include the index identifying the MA signature of the uplink transmission.

FIG. 21 is a flowchart of a method performed by a base station, according to another embodiment. In step 552, a grant-free uplink transmission is received. The grant-free uplink transmission utilizes an MA signature (e.g. a reference signal). The grant-free uplink transmission carries initial data from a UE. In step 554, the base station successfully detects the MA signature. However, decoding of the initial data is unsuccessful. Therefore, optionally, in step 556, the base station transmits a NACK. The NACK may identify the MA signature. In some embodiments, the MA signature may allow the base station to determine: the RV of the initial data, and/or the identity of the UE that sent the uplink transmission, and/or that the grant-free uplink transmission is an initial transmission of data.

FIG. 22 is a flowchart of a method performed by a UE, according to one embodiment. In step 602, the UE sends a grant-free uplink initial transmission, with an MA signature corresponding to an initial transmission, and with a first RV (e.g. RV 0). In step 604, the UE receives an ACK or a NACK from the base station or nothing is received by the expiry of a time-out period. If an ACK is received with information that can be used to identify the UE (i.e. "matching ID", e.g. a UE ID or an MA signature index corresponding to the MA signature used by the UE to send the initial transmission), then in step 606 no further action is taken. The UE knows the data has been successfully decoded. On the other hand, if a NACK is received with an MA signature index corresponding to the MA signature used by the UE to send the initial transmission, then in step 608 the UE performs a retransmission using the next RV index and the next MA signature (determined from a mapping relationship between MA signatures and initial transmissions and retransmissions, and determined from a mapping relationship between RVs and initial transmissions and retransmissions). On the other hand, if nothing is received from the base station by the expiry of the time-out period, then in step 610 the UE retransmits using the same RV and the same MA signature as the initial transmission sent in step 602.

Figure 23:
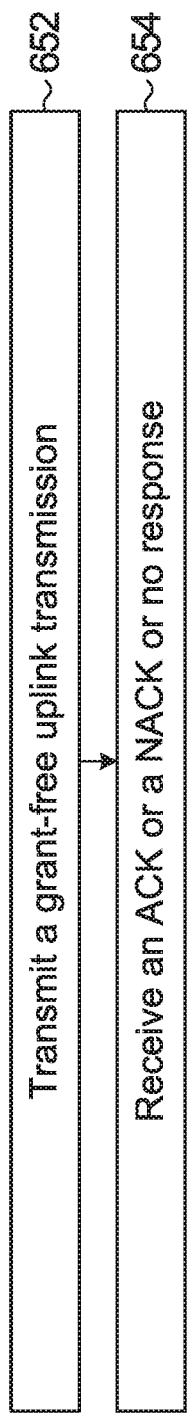
FIG. 23 is a flowchart of a method performed by a UE, according to another embodiment.

FIG. 23 is a flowchart of a method performed by a UE, according to another embodiment. In step 652, a grant-free uplink transmission is sent. The grant-free uplink transmission utilizes an MA signature (e.g. a reference signal). The grant-free uplink transmission carries initial data from a UE. In step 654, an ACK or a NACK or no response is received. The ACK or NACK may identify the MA signature. In some embodiments, the MA signature may identify: the RV of the initial data, and/or the identity of the UE, and/or that the grant-free uplink transmission is an initial transmission of data.

Figure 24:
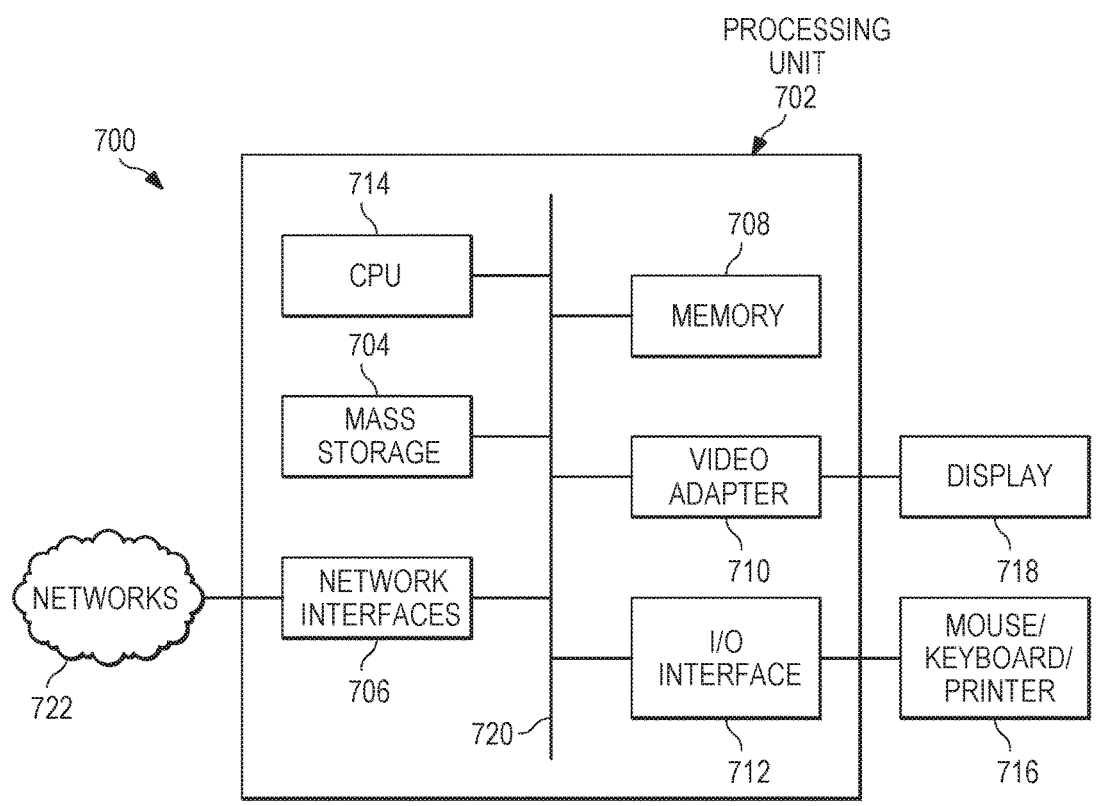
FIG. 24 is a block diagram of a computing system that may be used for implementing devices and methods disclosed herein.

FIG. 24 is a block diagram of a computing system 700 that may be used for implementing devices and methods disclosed herein. For example, the computing system may be or include a UE, or the computing system may be or include a network component (e.g. a base station). The computing system may also or instead be an AN, MM, SM, UPGW, AS, or other entity shown in the figures. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, an instantiating unit/module, an establishing unit/module for establishing a session link, a maintaining unit/module, other performing unit/module for performing one or more steps of the above steps. The respective units/modules may be hardware, software, or a combination thereof. For instance, one or more of the units/modules may be an integrated circuit, such as field programmable gate arrays (FPGAs) or application-specific integrated circuits (ASICs).

Some embodiments are now summarized and presented below.

Embodiment 1

A method performed by a base station comprising: receiving a grant-free uplink transmission, the grant-free uplink transmission utilizing an MA signature, and the grant-free uplink transmission carrying encoded data having an RV; detecting the MA signature of the grant-free uplink transmission; and identifying, based on the MA signature, the RV of the encoded data.

Embodiment 2

The method of embodiment 1, wherein the grant-free uplink transmission is a first grant-free uplink transmission, the MA signature is a first MA signature, the RV is a first RV, the method further comprising: identifying, based on at least one of the first MA signature and an uplink resource used by the first grant-free uplink transmission, that the first grant-free uplink transmission is an initial transmission of the encoded data; receiving a second grant-free uplink transmission utilizing a second MA signature and having a second RV; identifying, based on at least one of the second MA signature and an uplink resource used by the second grant-free uplink transmission, that the second grant-free uplink transmission is a retransmission of the encoded data; attempting to decode the encoded data using the initial transmission and the retransmission of the encoded data, the first RV, and the second RV.

Embodiment 3

The method of embodiment 2, wherein the second RV is the same as the first RV.

Embodiment 4

The method of embodiment 2, wherein the second RV is different from the first RV, and wherein the method further comprises: identifying, based on the second MA signature, the second RV.

Embodiment 5

The method of embodiment 2, wherein the second RV is different from the first RV, and wherein the method further comprises identifying the second RV by: identifying, based on the second MA signature, that the second grant-free uplink transmission is a retransmission of the encoded data; identifying a transmission attempt number of the retransmission; identifying the second RV in accordance with the transmission attempt number.

Embodiment 6

The method of any one of embodiments 1 to 5, wherein the MA signature is a reference signal.

Embodiment 7

A base station comprising: at least one antenna; and a grant-free transmission module; the at least one antenna configured to receive a grant-free uplink transmission, the grant-free uplink transmission utilizing a MA signature, and the grant-free uplink transmission carrying an encoded data having a RV; and the grant-free transmission module configured to: detect the MA signature of the grant-free uplink transmission and identify, based on the MA signature, the RV of the encoded data.

Embodiment 8

The base station of embodiment 7, wherein the grant-free uplink transmission is a first grant-free uplink transmission, the MA signature is a first MA signature, the RV is a first RV, and the base station further comprises a memory; further wherein: the grant-free transmission module is further configured to identify, based on at least one of the first MA signature and an uplink resource used by the first grant-free uplink transmission, that the first grant-free uplink transmission is an initial transmission of the encoded data; the at least one antenna is further configured to receive a second grant-free uplink transmission utilizing a second MA signature and having a second RV; the grant-free transmission module is further configured to identify, based on at least one of the second MA signature and an uplink resource used by the second grant-free uplink transmission, that the second grant-free uplink transmission is a retransmission of the encoded data; the grant-free transmission module is further configured to attempt to decode the encoded data using the initial transmission and the retransmission of the encoded data, the first RV, and the second RV.

Embodiment 9

The base station of embodiment 8, wherein the second RV is the same as the first RV.

Embodiment 10

The base station of embodiment 8, wherein the second RV is different from the first RV, and wherein the grant-free transmission module is further configured to identify, based on the second MA signature, the second RV.

Embodiment 11

The base station of embodiment 8, wherein the second RV is different from the first RV, and wherein the grant-free transmission module is configured to identify the second RV by: identifying, based on the second MA signature, that the second grant-free uplink transmission is a retransmission of the encoded data; identifying a transmission attempt number of the retransmission; identifying the second RV in accordance with the transmission attempt number.

Embodiment 12

The base station of any one of embodiments 7 to 11, wherein the MA signature is a reference signal.

Embodiment 13

A method performed by a UE comprising: encoding data using a RV to obtain encoded data; transmitting a grant-free uplink transmission carrying the encoded data, the grant-free uplink transmission utilizing a MA signature associated with the RV via a predetermined mapping between the MA signature and the RV.

Embodiment 14

The method of embodiment 13, wherein the grant-free uplink transmission is a first grant-free uplink transmission, the MA signature is a first MA signature, the RV is a first RV, the method further comprising: transmitting a retransmission of the encoded data in a second grant-free uplink transmission, the retransmission having a second RV, and the second grant-free uplink transmission utilizing at least one of a second MA signature and an uplink resource that identifies the second grant-free uplink transmission as the retransmission of the encoded data.

Embodiment 15

The method of embodiment 14, wherein the second RV is different from the first RV, and wherein the method further comprises: selecting the second RV based on the second MA signature.

Embodiment 16

The method of embodiment 15, wherein the second grant-free uplink transmission is a first retransmission of the encoded data, the method further comprising: selecting the second RV in accordance with the second grant-free uplink transmission being the first retransmission of the encoded data.

Embodiment 17

The method of any one of embodiments 13 to 16, wherein the grant-free uplink transmission is an initial grant-free uplink transmission of the encoded data, and wherein the method further comprises: without receiving a negative acknowledgement (NACK) addressed to the UE for the encoded data, transmitting at least one grant-free uplink retransmission of the encoded data until an ACK is received or until a number of grant-free uplink retransmissions reaches a predetermined value.

Embodiment 18

The method of any one of embodiments 13 to 16, wherein the grant-free uplink transmission is an initial grant-free uplink transmission of the encoded data, and wherein the method further comprises: without receiving NACK addressed to the UE for the encoded data, transmitting k grant-free uplink retransmissions of the encoded data.

Embodiment 19

A UE comprising: at least one antenna; and a grant-free transmission module; the grant-free transmission module configured to encode a data using a RV to obtain an encoded data; and the at least one antenna configured to transmit a grant-free uplink transmission carrying the encoded data, the grant-free uplink transmission utilizing a MA signature associated with the RV via a predetermined mapping between the MA signature and the RV.

Embodiment 20

The UE of embodiment 19, wherein the grant-free uplink transmission is a first grant-free uplink transmission, the MA signature is a first MA signature, the RV is a first RV, and the at least one antenna is further configured to transmit a retransmission of the encoded data in a second grant-free uplink transmission, the retransmission having a second RV, and the second grant-free uplink transmission utilizing at least one of a second MA signature and an uplink resource that identifies the second grant-free uplink transmission as the retransmission of the encoded data.

Embodiment 21

The UE of embodiment 19, wherein the second RV is different from the first RV, and wherein the grant-free transmission module is further configured to select the second RV based on the second MA signature.

Embodiment 22

The UE of embodiment 21, wherein the grant-free transmission module is further configured to also select the second RV based on the transmission being a first retransmission.

Embodiment 23

The UE of any one of embodiments 19 to 22, wherein the grant-free uplink transmission is an initial grant-free uplink transmission of the encoded data, and wherein the grant-free transmission module is further configured to: without receiving a negative acknowledgement (NACK) addressed to the UE for the encoded data, transmit at least one grant-free uplink retransmission of the encoded data until an ACK is received or until a number of grant-free uplink retransmissions reaches a predetermined value.

Embodiment 24

The UE of any one of embodiments 19 to 22, wherein the grant-free uplink transmission is an initial grant-free uplink transmission of the encoded data, and wherein the grant-free transmission module is further configured to: without receiving a NACK addressed to the UE for the encoded data, transmit k grant-free uplink retransmissions of the encoded data.

Embodiment 25

A method performed by a UE comprising: transmitting an initial grant-free uplink transmission of encoded data; without receiving a NACK for the encoded data, addressed to the UE, transmitting at least one grant-free uplink retransmission of the encoded data.

Embodiment 26

The method of embodiment 25, wherein the initial grant-free uplink transmission utilizes a first MA signature, and a grant-free uplink retransmission of the encoded data utilizes a second MA signature and carries retransmission data for facilitating decoding of the encoded data.

Embodiment 27

The method of embodiment 26, wherein the first MA signature comprises a first reference signal.

Embodiment 28

The method of embodiment 26 or embodiment 27, wherein the second MA signature comprises a second reference signal.

Embodiment 29

The method of any one of embodiments 26 to 28, wherein the first and second MA signatures are different from one another.

Embodiment 30

The method of any one of embodiments 26 to 29, wherein the first MA signature and the second MA signature are selected from a pre-defined tuple of MA signatures.

Embodiment 31

The method of any one of embodiments 26 to 30, wherein the first MA signature indicates a RV of the encoded data in the initial grant-free uplink transmission.

Embodiment 32

The method of any one of embodiments 26 to 31, wherein the second MA signature indicates an RV of the encoded data in the grant-free uplink retransmission.

Embodiment 33

The method of any one of embodiments 26 to 32, wherein the initial grant-free uplink transmission is transmitted on a first uplink resource and the grant-free uplink retransmission is transmitted on a second uplink resource, wherein the second uplink resource is different from the first uplink resource.

Embodiment 34

The method of embodiment 33, wherein the UE selects the first and second uplink resources based on a pre-defined resource hopping pattern.

Embodiment 35

The method of any one of embodiments 25 to 34, further comprising transmitting grant-free uplink retransmissions until receiving an ACK addressed to the UE.

Embodiment 36

The method of embodiment 35, wherein the ACK is received on a downlink acknowledgement channel.

Embodiment 37

The method of any one of embodiments 25 to 34, further comprising: without receiving the NACK addressed to the UE, transmitting the at least one grant-free uplink retransmission of the encoded data until an ACK is received or until a number of grant-free uplink retransmissions reaches a predetermined value.

Embodiment 38

The method of any one of embodiments 25 to 34, further comprising: without receiving the NACK addressed to the UE, transmitting k grant-free uplink retransmissions of the encoded data.

Embodiment 39

The method of any one of embodiments 25 to 38, wherein the initial grant-free uplink transmission utilizes at least one of an MA signature and an uplink resource that identifies the initial grant-free uplink transmission as the initial transmission of the encoded data.

Embodiment 40

The method of any one of embodiments 25 to 39, wherein a grant-free uplink transmission from the UE utilizes at least one of an MA signature and an uplink resource that identifies a RV of the encoded data in the grant-free uplink transmission.

Embodiment 41

The method of any one of embodiments 25 to 40, wherein transmitting the at least one grant-free uplink retransmission of the encoded data occurs without waiting for receipt of the NACK.

Embodiment 42

A UE comprising: at least one antenna; and a grant-free transmission module; the at least one antenna configured to transmit an initial grant-free uplink transmission of encoded data; the grant-free transmission module configured to, without receiving a NACK addressed to the UE for the encoded data, cause the UE to transmit at least one grant-free uplink retransmission of the encoded data.

Embodiment 43

The UE of embodiment 42, wherein the initial grant-free uplink transmission utilizes a first MA signature, and a grant-free uplink retransmission of the encoded data utilizes a second MA signature and carries retransmission data for facilitating successful decoding of the encoded data.

Embodiment 44

The UE of embodiment 43, wherein the first MA signature comprises a first reference signal.

Embodiment 45

The UE of embodiment 43 or 44, wherein the second MA signature comprises a second reference signal.

Embodiment 46

The UE of any one of embodiments 43 to 45, wherein the first and second MA signatures are different from one another.

Embodiment 47

The UE of any one of embodiments 43 to 46, wherein the first MA signature and the second MA signature are selected from a pre-defined tuple of MA signatures.

Embodiment 48

The UE of any one of embodiments 43 to 47, wherein the first MA signature indicates a RV of the encoded data in the initial grant-free uplink transmission.

Embodiment 49

The UE of any one of embodiments 43 to 48, wherein the second MA signature indicates an RV of the encoded data in the grant-free uplink retransmission.

Embodiment 50

The UE of any one of embodiments 43 to 49, wherein the initial grant-free uplink transmission is transmitted on a first uplink resource and the grant-free uplink retransmission is transmitted on a second uplink resource, wherein the second uplink resource is different from the first uplink resource.

Embodiment 51

The UE of embodiment 50, wherein the grant-free transmission module is configured to select the first and second uplink resources based on a pre-defined resource hopping pattern.

Embodiment 52

The UE of any one of embodiments 42 to 51, wherein the grant-free transmission module is configured to cause the UE to transmit grant-free uplink retransmissions until receiving an ACK addressed to the UE.

Embodiment 53

The UE of embodiment 52, wherein the ACK is received on a downlink acknowledgement channel.

Embodiment 54

The UE of any one of embodiments 42 to 53, wherein the grant-free transmission module is further configured to: without receiving the NACK addressed to the UE, cause the UE to transmit the at least one grant-free uplink retransmission of the encoded data until an ACK is received or until a number of grant-free uplink retransmissions reaches a pre-determined value.

Embodiment 55

The UE of any one of embodiments 42 to 53, wherein the grant-free transmission module is further configured to: without receiving the NACK addressed to the UE, cause the UE to transmit k grant-free uplink retransmissions of the encoded data.

Embodiment 56

The UE of any one of embodiments 42 to 55, wherein the initial grant-free uplink transmission utilizes at least one of an MA signature and an uplink resource that identifies the initial grant-free uplink transmission as the initial transmission of the encoded data.

Embodiment 57

The UE of any one of embodiments 42 to 56, wherein a grant-free uplink transmission from the UE utilizes at least one of an MA signature and an uplink resource that identifies a RV of the encoded data in the grant-free uplink transmission.

Embodiment 58

The UE of any one of embodiments 42 to 57, wherein the grant-free transmission module is further configured to: transmit the at least one grant-free uplink retransmission of the encoded data without waiting for receipt of the NACK.

Embodiment 59

A method performed by a base station comprising: receiving an initial grant-free uplink transmission of encoded data from UE; without transmitting a NACK for the encoded data, receiving at least one grant-free uplink retransmission of the encoded data.

Embodiment 60

The method of embodiment 59, wherein: the initial grant-free uplink transmission utilizes a first MA signature; a grant-free uplink retransmission of the encoded data is also received without transmitting an ACK for the encoded data; and the grant-free uplink retransmission of the encoded data utilizes a second MA signature and carries retransmission data for facilitating decoding of the encoded data.

Embodiment 61

The method of embodiment 60, wherein the first MA signature comprises a first reference signal and the second MA signature comprises a second reference signal, the method further comprising: successfully detecting the first and second MA signatures but unsuccessfully decoding the encoded data in the initial grant-free uplink transmission; storing in memory an identity of the first MA signature and unsuccessfully decoded data from the initial grant-free uplink transmission; retrieving the unsuccessfully decoded data based on an identity of the second MA signature; and using the retransmission data and the unsuccessfully decoded data to decode the encoded data.

Embodiment 62

The method of embodiment 61, further comprising sending an ACK to the UE upon successfully decoding the encoded data.

Embodiment 63

The method of embodiment 62, wherein the ACK is sent on a downlink acknowledgement channel.

Embodiment 64

The method of any one of embodiments 59 to 63, further comprising: receiving grant-free uplink retransmissions of the encoded data until an ACK is sent or until a number of the grant-free uplink retransmissions reaches a predetermined value.

Embodiment 65

The method of any one of embodiments 59 to 63, further comprising: without transmitting the NACK for the encoded data, receiving k grant-free uplink retransmissions of the encoded data.

Embodiment 66

The method of any one of embodiments 59 to 65, wherein the initial grant-free uplink transmission utilizes at least one of an MA signature and an uplink resource that identifies the initial grant-free uplink transmission as the initial transmission of the encoded data.

Embodiment 67

The method of any one of embodiments 59 to 66, wherein a grant-free uplink transmission from the UE utilizes at least one of an MA signature and an uplink resource that identifies a RV of the encoded data in the grant-free uplink transmission.

Embodiment 68

A base station comprising: at least one antenna; and a grant-free transmission module; the at least one antenna configured to receive an initial grant-free uplink transmission of an encoded data; the grant-free transmission module configured to, without generating a NACK for the encoded data, receive via the at least one antenna at least one grant-free uplink retransmission of the encoded data.

Embodiment 69

The base station embodiment 60, wherein: the initial grant-free uplink transmission utilizes a first MA signature; a grant-free uplink retransmission of the encoded data is also received without generating an ACK for the encoded data; and the grant-free uplink retransmission of the encoded data utilizes a MA signature and carries retransmission data for facilitating decoding of the encoded data.

Embodiment 70

The base station of embodiment 69, wherein the first MA signature comprises a first reference signal and the second MA signature comprises a second reference signal, and the grant-free transmission module is configured to: successfully detect the first and second MA signatures and, upon unsuccessfully decoding the encoded data in the initial grant-free uplink transmission: store in memory an identity of the first MA signature and the unsuccessfully decoded data from the initial grant-free uplink transmission; retrieve the unsuccessfully decoded data based on an identity of the second MA signature; and use the retransmission data and the unsuccessfully decoded data to decode the encoded data.

Embodiment 71

The base station of embodiment 70, wherein the grant-free transmission module is configured to cause the base station to send an ACK to the UE upon successfully decoding the encoded data.

Embodiment 72

The base station of embodiment 71, wherein the ACK is sent on a downlink acknowledgement channel.

Embodiment 73

The base station of any one of embodiments 68 to 72, wherein the grant-free transmission module is further configured to: receive grant-free uplink retransmissions of the encoded data until an ACK is generated or until a number of the grant-free uplink retransmissions reaches a predetermined value.

Embodiment 74

The base station of any one of embodiments 68 to 72, wherein the grant-free transmission module is further configured to: without generating the NACK for the encoded data, receive k subsequent grant-free uplink retransmissions of the encoded data.

Embodiment 75

The base station of any one of embodiments 68 to 74, wherein the initial grant-free uplink transmission utilizes at least one of an MA signature and an uplink resource that identifies the initial grant-free uplink transmission as the initial transmission of the encoded data.

Embodiment 76

The base station of any one of embodiments 68 to 75, wherein a grant-free uplink transmission from the UE utilizes at least one of an MA signature and an uplink resource that identifies a RV of the encoded data in the grant-free uplink transmission.

Embodiment 77

A method performed by a base station comprising: receiving a grant-free uplink transmission, the grant-free uplink transmission utilizing a MA signature and carrying encoded data from a UE; successfully detecting the MA signature but unsuccessfully decoding the encoded data; and transmitting a NACK to the UE, wherein the NACK identifies the MA signature.

Embodiment 78

A method performed by a base station comprising: receiving a grant-free uplink transmission, the grant-free uplink transmission utilizing a MA signature and carrying encoded data from a UE; successfully detecting the MA signature and attempting to decode the encoded data; and transmitting an ACK or a NACK to the UE, wherein the ACK or the NACK identifies the MA signature.

Embodiment 79

The method of embodiment 77 or embodiment 78, wherein the MA signature comprises a reference signal.

Embodiment 80

The method of any one of embodiments 77 to 79, further comprising determining a RV of the encoded data based on the MA signature.

Embodiment 81

The method of any one of embodiments 77 to 80, further comprising: determining that the grant-free uplink transmission was an initial transmission of the encoded data based on the MA signature.

Embodiment 82

The method of any one of embodiments 77 to 81, further comprising: determining an identity of the UE that sent the grant-free uplink transmission based on the MA signature.

Embodiment 83

The method of any one of embodiments 77 to 82, wherein the MA signature is a first MA signature, wherein the grant-free uplink transmission is an initial transmission of the encoded data, and wherein the method further comprises: receiving a subsequent grant-free uplink transmission carrying a retransmission of the encoded data, the subsequent grant-free uplink transmission utilizing a second MA signature; successfully detecting the second MA signature; using the initial transmission and the retransmission to decode the encoded data.

Embodiment 84

The method of embodiment 83, further comprising retrieving data of the initial transmission by: identifying the first MA signature based on the second MA signature, and retrieving the data associated with the first MA signature.

Embodiment 85

The method of embodiment 83 or embodiment 84, further comprising determining the RV of the retransmission data based on the second MA signature.

Embodiment 86

The method of any one of embodiments 83 to 85, further comprising: determining that the second grant-free uplink transmission was a first retransmission based on the second MA signature.

Embodiment 87

The method of any one of embodiments 83 to 86, further comprising: determining the identity of the UE that sent the second grant-free uplink transmission based on the second MA signature.

Embodiment 88

A base station comprising: at least one antenna; and a grant-free transmission module; the at least one antenna configured to receive a grant-free uplink transmission, the grant-free uplink transmission utilizing a MA signature and carrying encoded data from a UE; the grant-free transmission module to detect the MA signature and, upon unsuccessfully decoding of the encoded data, generate a NACK to transmit to the UE, wherein the NACK identifies the MA signature.

Embodiment 89

A base station comprising: at least one antenna; and a grant-free transmission module; the at least one antenna configured to receive a grant-free uplink transmission, the grant-free uplink transmission utilizing a MA signature and carrying encoded data from a UE; the grant-free transmission module to detect the MA signature, attempt to decode the encoded data, and generate an ACK or a NACK, wherein the ACK or the NACK identifies the MA signature.

Embodiment 90

The base station of embodiment 88 or embodiment 89, wherein the MA signature comprises a reference signal.

Embodiment 91

The base station of any one of embodiments 88 to 90, wherein the grant-free transmission module is further configured to determine a RV of the encoded data based on the MA signature.

Embodiment 92

The base station of any one of embodiments 88 to 91, wherein the grant-free transmission module is further configured to determine that the grant-free uplink transmission was an initial transmission of the encoded data based on the MA signature.

Embodiment 93

The base station of any one of embodiments 88 to 92, wherein the grant-free transmission module is further configured to determine an identity of the UE that sent the grant-free uplink transmission based on the MA signature.

Embodiment 94

The base station of any one of embodiments 88 to 93, wherein the MA signature is a first MA signature, wherein the grant-free uplink transmission is an initial transmission of the encoded data, and wherein: the at least one antenna is configured to receive a subsequent grant-free uplink transmission carrying a retransmission of the encoded data, the subsequent grant-free uplink transmission utilizing a second MA signature; the grant-free transmission module is further configured to successfully detect the second MA signature and use the initial transmission and the retransmission to decode the encoded data.

Embodiment 95

The base station of embodiment 94, wherein the grant-free transmission module is further configured to retrieve data of the initial transmission by: identifying the first MA signature based on the second MA signature, and retrieving the data associated with the first MA signature.

Embodiment 96

The base station of embodiment 94 or embodiment 95, wherein the grant-free transmission module is further configured to determine the RV of the retransmission data based on the second MA signature.

Embodiment 97

The base station of any one of embodiments 94 to 96, wherein the grant-free transmission module is further configured to determine that the second grant-free uplink transmission was a first retransmission based on the second MA signature.

Embodiment 98

The base station of any one of embodiments 94 to 97, wherein the grant-free transmission module is further configured to determine the identity of the UE that sent the second grant-free uplink transmission based on the second MA signature.

Embodiment 99

The base station of any one of embodiments 88 to 98, wherein upon unsuccessfully decoding of the encoded data, the grant-free transmission module is further configured to store in memory an identity of the MA signature and data of the unsuccessfully decoded encoded data.

Embodiment 100

A method performed by a UE comprising: transmitting a grant-free uplink transmission, the grant-free uplink transmission utilizing a MA signature, and the grant-free uplink transmission carrying encoded data; receiving a NACK that identifies the MA signature.

Embodiment 101

A method performed by a UE comprising: transmitting a grant-free uplink transmission, the grant-free uplink transmission utilizing a MA signature, and the grant-free uplink transmission carrying encoded data; receiving an ACK or a NACK, the ACK or the NACK identifying the MA signature.

Embodiment 102

The method of embodiment 100 or 101, wherein the MA signature comprises a reference signal.

Embodiment 103

The method of any one of embodiments 100 to 102, wherein the MA signature identifies the RV of the encoded data.

Embodiment 104

The method of any one of embodiments 100 to 103, wherein the MA signature identifies that the grant-free uplink transmission is an initial transmission of the encoded data.

Embodiment 105

The method of any one of embodiments 100 to 104, wherein the MA signature identifies the UE.

Embodiment 106

The method of any one of embodiments 100 to 105, wherein the MA signature is a first MA signature, wherein the grant-free uplink transmission is an initial grant-free uplink transmission, and wherein the method further comprises: transmitting a second grant-free uplink transmission, the second grant-free uplink transmission utilizing a second MA signature, and the second grant-free uplink transmission carrying a retransmission of the encoded data.

Embodiment 107

The method of embodiment 106, wherein the second MA signature identifies a RV of the retransmission of the encoded data.

Embodiment 108

The method of embodiment 106 or 107, wherein the second MA signature identifies that the second grant-free uplink transmission is a retransmission of the encoded data.

Embodiment 109

The method of any one of embodiments 106 to 108, wherein the second MA signature identifies the UE.

Embodiment 110

A UE comprising: at least one antenna; and a grant-free transmission module; the grant-free transmission module configured to cause the at least one antenna to transmit a grant-free uplink transmission, the grant-free uplink transmission utilizing a MA signature, and the grant-free uplink transmission carrying an encoded data; the grant-free transmission module configured to receive a NACK that identifies the MA signature.

Embodiment 111

A UE comprising: at least one antenna; and a grant-free transmission module; the grant-free transmission module configured to cause the at least one antenna to transmit a grant-free uplink transmission, the grant-free uplink transmission utilizing a MA signature, and the grant-free uplink transmission carrying an encoded data; the grant-free transmission module configured to receive an ACK or a NACK via the at least one antenna, the ACK or the NACK identifies the MA signature.

Embodiment 112

The UE of embodiment 110 or embodiment 111, wherein the MA signature comprises a reference signal.

Embodiment 113

The UE of any one of embodiments 110 to 112, wherein the MA signature identifies the RV of the encoded data.

Embodiment 114

The UE of any one of embodiments 110 to 113, wherein the MA signature identifies that the grant-free uplink transmission is an initial transmission of the encoded data.

Embodiment 115

The UE of any one of embodiments 110 to 114, wherein the MA signature identifies the UE.

Embodiment 116

The UE of any one of embodiments 110 to 115, wherein the MA signature is a first MA signature, wherein the grant-free uplink transmission is an initial grant-free uplink transmission, and wherein the grant-free transmission module is further configured to: cause the at least one antenna to transmit a second grant-free uplink transmission, the second grant-free uplink transmission utilizing a second MA signature, and the second grant-free uplink transmission carrying a retransmission of the encoded data.

Embodiment 117

The UE of embodiment 116, wherein the second MA signature identifies a RV of the retransmission of the encoded data.

Embodiment 118

The UE of embodiment 116 or embodiment 117, wherein the second MA signature identifies that the second grant-free uplink transmission is a retransmission of the encoded data.

Embodiment 119

The UE of any one of embodiments 116 to 118, wherein the second MA signature identifies the UE.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE) comprising:
    transmitting an initial grant-free uplink transmission of encoded data;
    without receiving a negative acknowledgement (NACK) for the encoded data, addressed to the UE, transmitting at least one grant-free uplink retransmission of the encoded data;
    wherein the initial grant-free uplink transmission utilizes a first multiple access (MA) signature, and a grant-free uplink retransmission of the encoded data utilizes a second MA signature and carries retransmission data for facilitating decoding of the encoded data.

2. The method of claim 1, wherein the first MA signature comprises a first reference signal.

3. The method of claim 1, wherein the second MA signature comprises a second reference signal.

4. The method of claim 1, wherein the first and second MA signatures are different from one another.

5. The method of claim 1, wherein the first MA signature and the second MA signature are selected from a pre-defined tuple of MA signatures.

6. The method of claim 1, wherein the first MA signature indicates a redundancy version (RV) of the encoded data in the initial grant-free uplink transmission.

7. The method of claim 1, wherein the second MA signature indicates a redundancy version (RV) of the encoded data in the grant-free uplink retransmission.

8. The method of claim 1, wherein the initial grant-free uplink transmission is transmitted on a first uplink resource and the grant-free uplink retransmission is transmitted on a second uplink resource, wherein the second uplink resource is different from the first uplink resource.

9. The method of claim 8, wherein the UE selects the first and second uplink resources based on a pre-defined resource hopping pattern.

10. The method of claim 1, further comprising transmitting grant-free uplink retransmissions until receiving an acknowledgement (ACK) addressed to the UE.

11. The method of claim 10, wherein the ACK is received on a downlink acknowledgement channel.

12. The method of claim 1, further comprising:
without receiving the NACK addressed to the UE, transmitting the at least one grant-free uplink retransmission of the encoded data until an acknowledgement (ACK) is received or until a number of grant-free uplink retransmissions reaches a predetermined value.

13. The method of claim 1, further comprising:
without receiving the NACK addressed to the UE, transmitting k grant-free uplink retransmissions of the encoded data.

14. The method of claim 1, wherein at least one of the first MA signature and an uplink resource identifies the initial grant-free uplink transmission as the initial transmission of the encoded data.

15. A method performed by a user equipment (UE) comprising:
transmitting an initial grant-free uplink transmission of encoded data;
without receiving a negative acknowledgement (NACK) for the encoded data, addressed to the UE, transmitting at least one grant-free uplink retransmission of the encoded data;
wherein a grant-free uplink transmission from the UE utilizes at least one of a multiple access (MA) signature and an uplink resource that identifies a redundancy version (RV) of the encoded data in the grant-free uplink transmission.

16. The method of claim 1, wherein transmitting the at least one grant-free uplink retransmission of the encoded data occurs without waiting for receipt of the NACK.

17. A user equipment (UE) comprising:
at least one antenna; and
a grant-free transmission module;
the at least one antenna configured to transmit an initial grant-free uplink transmission of encoded data;
the grant-free transmission module configured to, without receiving a negative acknowledgement (NACK) addressed to the UE for the encoded data, cause the UE to transmit at least one grant-free uplink retransmission of the encoded data;
wherein the initial grant-free uplink transmission utilizes a first multiple access (MA) signature, and a grant-free uplink retransmission of the encoded data utilizes a second MA signature and carries retransmission data for facilitating successful decoding of the encoded data.

18. The UE of claim 17, wherein the first MA signature comprises a first reference signal.

19. The UE of claim 17, wherein the second MA signature comprises a second reference signal.

20. The UE of claim 17, wherein the first and second MA signatures are different from one another.

21. The UE of claim 17, wherein the first MA signature and the second MA signature are selected from a pre-defined tuple of MA signatures.

22. The UE of claim 17, wherein the first MA signature indicates a a redundancy version (RV) of the encoded data in the initial grant-free uplink transmission.

23. The UE of claim 17, wherein the second MA signature indicates an a redundancy version (RV) of the encoded data in the grant-free uplink retransmission.

24. The UE of claim 17, wherein the initial grant-free uplink transmission is transmitted on a first uplink resource and the grant-free uplink retransmission is transmitted on a second uplink resource, wherein the second uplink resource is different from the first uplink resource.

25. The UE of claim 24, wherein the grant-free transmission module is configured to select the first and second uplink resources based on a pre-defined resource hopping pattern.

26. The UE of claim 17, wherein the grant-free transmission module is configured to cause the UE to transmit grant-free uplink retransmissions until receiving an acknowledgement (ACK) addressed to the UE.

27. The UE of claim 26, wherein the ACK is received on a downlink acknowledgement channel.

28. The UE of claim 17, wherein the grant-free transmission module is further configured to:
without receiving the NACK addressed to the UE, cause the UE to transmit the at least one grant-free uplink retransmission of the encoded data until an acknowledgement (ACK) is received or until a number of grant-free uplink retransmissions reaches a predetermined value.

29. The UE of claim 17, wherein the grant-free transmission module is further configured to:
without receiving the NACK addressed to the UE, cause the UE to transmit k grant-free uplink retransmissions of the encoded data.

30. The UE of claim 17, wherein at least one of the first MA signature and an uplink resource identifies the initial grant-free uplink transmission as the initial transmission of the encoded data.

31. A user equipment (UE) comprising:
at least one antenna; and
a grant-free transmission module;
the at least one antenna configured to transmit an initial grant-free uplink transmission of encoded data;
the grant-free transmission module configured to, without receiving a negative acknowledgement (NACK) addressed to the UE for the encoded data, cause the UE to transmit at least one grant-free uplink retransmission of the encoded data,
wherein a grant-free uplink transmission from the UE utilizes at least one of a multiple access (MA) signature and an uplink resource that identifies a redundancy version (RV) of the encoded data in the grant-free uplink transmission.

32. The UE of claim 17, wherein the grant-free transmission module is further configured to: transmit the at least one grant-free uplink retransmission of the encoded data without waiting for receipt of the NACK.

33. A method performed by a base station comprising:
receiving an initial grant-free uplink transmission of encoded data from a user equipment (UE);
without transmitting a negative acknowledgement (NACK) for the encoded data, receiving at least one grant-free uplink retransmission of the encoded data;

wherein:
the initial grant-free uplink transmission utilizes a first multiple access (MA) signature;
a grant-free uplink retransmission of the encoded data is also received without transmitting an acknowledgement (ACK) for the encoded data; and
the grant-free uplink retransmission of the encoded data utilizes a second multiple access (MA) signature and carries retransmission data for facilitating decoding of the encoded data.

34. The method of claim 33, wherein the first MA signature comprises a first reference signal and the second MA signature comprises a second reference signal, the method further comprising:
successfully detecting the first and second MA signatures but unsuccessfully decoding the encoded data in the initial grant-free uplink transmission;
storing in memory an identity of the first MA signature and unsuccessfully decoded data from the initial grant-free uplink transmission;
retrieving the unsuccessfully decoded data based on an identity of the second MA signature; and
using the retransmission data and the unsuccessfully decoded data to decode the encoded data.

35. The method of claim 34, further comprising sending an acknowledgement (ACK) to the UE upon successfully decoding the encoded data.

36. The method of claim 35, wherein the ACK is sent on a downlink acknowledgement channel.

37. The method of claim 33, further comprising:
receiving grant-free uplink retransmissions of the encoded data until an acknowledgement (ACK) is sent or until a number of the grant-free uplink retransmissions reaches a predetermined value.

38. The method of claim 33, further comprising:
without transmitting the NACK for the encoded data, receiving k grant-free uplink retransmissions of the encoded data.

39. The method of claim 33, wherein at least one of the first MA signature and an uplink resource identifies the initial grant-free uplink transmission as the initial transmission of the encoded data.

40. A method performed by a base station comprising:
receiving an initial grant-free uplink transmission of encoded data from a user equipment (UE);
without transmitting a negative acknowledgement (NACK) for the encoded data, receiving at least one grant-free uplink retransmission of the encoded data;
wherein a grant-free uplink transmission from the UE utilizes at least one of a multiple access (MA) signature and an uplink resource that identifies a redundancy version (RV) of the encoded data in the grant-free uplink transmission.

41. A base station comprising:
at least one antenna; and
a grant-free transmission module;
the at least one antenna configured to receive an initial grant-free uplink transmission of an encoded data;
the grant-free transmission module configured to, without generating a negative acknowledgement (NACK) for the encoded data, receive via the at least one antenna at least one grant-free uplink retransmission of the encoded data, wherein:
the initial grant-free uplink transmission utilizes a first multiple access (MA) signature;
a grant-free uplink retransmission of the encoded data is also received without generating an acknowledgement (ACK) for the encoded data; and
the grant-free uplink retransmission of the encoded data utilizes a second multiple access (MA) signature and carries retransmission data for facilitating decoding of the encoded data.

42. The base station of claim 41, wherein the first MA signature comprises a first reference signal and the second MA signature comprises a second reference signal, and the grant-free transmission module is configured to:
successfully detect the first and second MA signatures and, upon unsuccessfully decoding the encoded data in the initial grant-free uplink transmission: store in memory an identity of the first MA signature and the unsuccessfully decoded data from the initial grant-free uplink transmission; retrieve the unsuccessfully decoded data based on an identity of the second MA signature; and use the retransmission data and the unsuccessfully decoded data to decode the encoded data.

43. The base station of claim 42, wherein the grant-free transmission module is configured to cause the base station to send an acknowledgement (ACK) to the UE upon successfully decoding the encoded data.

44. The base station of claim 43, wherein the ACK is sent on a downlink acknowledgement channel.

45. The base station of claim 41, wherein the grant-free transmission module is further configured to:
receive grant-free uplink retransmissions of the encoded data until an acknowledgement (ACK) is generated or until a number of the grant-free uplink retransmissions reaches a predetermined value.

46. The base station of claim 41, wherein the grant-free transmission module is further configured to:
without generating the NACK for the encoded data, receive k subsequent grant-free uplink retransmissions of the encoded data.

47. The base station of claim 41, wherein the initial grant-free uplink transmission utilizes at least one of a multiple access (MA) signature and an uplink resource that identifies the initial grant-free uplink transmission as the initial transmission of the encoded data.

48. A base station comprising:
at least one antenna; and
a grant-free transmission module;
the at least one antenna configured to receive an initial grant-free uplink transmission of an encoded data;
the grant-free transmission module configured to, without generating a negative acknowledgement (NACK) for the encoded data, receive via the at least one antenna at least one grant-free uplink retransmission of the encoded data;
wherein a grant-free uplink transmission from the UE utilizes at least one of a multiple access (MA) signature and an uplink resource that identifies a redundancy version (RV) of the encoded data in the grant-free uplink transmission.

* * * * *